US011305598B2

(12) United States Patent
Booth et al.

(10) Patent No.: US 11,305,598 B2
(45) Date of Patent: Apr. 19, 2022

(54) RECREATIONAL OFF-HIGHWAY VEHICLE

(71) Applicant: YAMAHA HATSUDOKI KABUSHIKI KAISHA, Shizuoka (JP)

(72) Inventors: Todd A. Booth, Newnan, GA (US);
Keith E. Kotrla, Magnolia, TX (US);
Louis R. Doucette, Acworth, GA (US);
Craig S. Letourneau, Senoia, GA (US); Thomas Teribury, Senoia, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 195 days.

(21) Appl. No.: 16/529,453

(22) Filed: Aug. 1, 2019

(65) Prior Publication Data

US 2021/0031579 A1 Feb. 4, 2021

(51) Int. Cl.
*B60G 3/20* (2006.01)
*B60K 17/16* (2006.01)
*B62D 23/00* (2006.01)

(52) U.S. Cl.
CPC .............. *B60G 3/20* (2013.01); *B60K 17/165* (2013.01); *B60G 2204/128* (2013.01); *B60G 2300/07* (2013.01); *B60G 2300/124* (2013.01); *B60G 2300/13* (2013.01); *B62D 23/005* (2013.01)

(58) Field of Classification Search
CPC ................ B60G 3/20; B60G 2300/124; B60G 2300/13; B60G 2204/128; B60G 2300/07; B60G 15/062; B60G 13/00; B60G 7/02; B60G 2200/314; B60G 2200/422; B60G 2202/12; B60G 2202/24; B60G 2202/31; B60G 2204/143; B60G 2206/427; B60G 9/00; B60G 9/025; B60G 11/14; B60K 17/165; B60K 2005/003; B60K 1/00; B62D 23/005; B60Y 2400/86; B60Y 2200/20

See application file for complete search history.

(56) References Cited

U.S. PATENT DOCUMENTS 4,334,696 A * 6/1982 Bergstrom ............... B60G 9/00
280/124.104
5,921,341 A * 7/1999 Atkins ................... B60G 7/001
180/350

(Continued)

FOREIGN PATENT DOCUMENTS

AU 9944832 A * 3/2000

*Primary Examiner* — Darlene P Condra
(74) *Attorney, Agent, or Firm* — Global IP Counselors, LLP

(57) ABSTRACT

A recreational off-highway vehicle includes a vehicle frame, at least one front wheel, a pair of rear wheels, a solid rear axle, a pair of trailing arms, a rear differential and a motor. The solid rear axle rotatably supports the rear wheels at its opposite ends. Each of the trailing arms is pivotally connected to the vehicle frame and the solid rear axle. A shock absorber is coupled between the vehicle frame and each of the trailing arms. The rear differential is supported on the solid rear axle and connected to the rear wheels. The transmission has a propeller shaft connected to the rear differential to drive the rear wheels. The motor is connected operatively to the transmission. The propeller shaft includes first and second drive sections that articulates relative to each other. The second drive section is connected to the rear differential.

23 Claims, 22 Drawing Sheets

(56) References Cited

U.S. PATENT DOCUMENTS

| | | | |
|---|---|---|---|
| 6,076,624 A * | 6/2000 | Izumi | F16D 41/06 |
| | | | 180/291 |
| 6,491,126 B1 * | 12/2002 | Robison | B60K 17/3462 |
| | | | 180/233 |
| 7,934,579 B2 | 5/2011 | Bowers | |
| 8,464,611 B1 * | 6/2013 | Chandler | F16H 57/037 |
| | | | 74/607 |
| 9,248,877 B1 | 2/2016 | Sawai | |
| 9,440,671 B2 | 9/2016 | Schlangen et al. | |
| 10,479,422 B2 * | 11/2019 | Hollman | B62D 33/02 |
| 2005/0045411 A1 * | 3/2005 | Knapke | B60G 9/00 |
| | | | 180/337 |
| 2005/0253353 A1 * | 11/2005 | Yamamura | B60G 3/20 |
| | | | 280/124.135 |
| 2006/0017256 A1 * | 1/2006 | Hupperich | B60G 9/00 |
| | | | 280/124.156 |
| 2007/0256659 A1 * | 11/2007 | Anderson | B60G 15/067 |
| | | | 123/198 R |
| 2013/0277937 A1 | 10/2013 | Keller et al. | |
| 2015/0232126 A1 * | 8/2015 | Okuyama | B60K 17/165 |
| | | | 280/781 |
| 2016/0176287 A1 * | 6/2016 | Ripley | B60K 17/08 |
| | | | 180/365 |
| 2016/0347137 A1 * | 12/2016 | Despres-Nadeau | B60G 3/14 |
| 2016/0347350 A1 * | 12/2016 | Heon | B60G 3/20 |
| 2017/0080977 A1 | 3/2017 | Schroeder et al. | |
| 2018/0272819 A1 * | 9/2018 | Galla | B60G 7/001 |
| 2019/0211915 A1 * | 7/2019 | Davis | B62D 21/18 |
| 2019/0367086 A1 * | 12/2019 | De Grammont | B60K 17/20 |
| 2020/0025275 A1 * | 1/2020 | Schroeder | F16D 3/841 |
| 2021/0022331 A1 * | 1/2021 | Baxter | A01M 7/0071 |

\* cited by examiner

RECREATIONAL OFF-HIGHWAY VEHICLE

BACKGROUND

Field of the Invention

The present invention generally relates to the field of recreational off-highway vehicles. More specifically, the present invention relates to a recreational off-highway vehicle having a rear suspension assembly with a solid rear axle.

Background Information

Generally, recreational off-highway vehicles are designed to be operated over rough terrain. Basically, a recreational off-highway vehicle is considered to be any small vehicle that is not street legal. In other words, a recreational off-highway vehicle is not equipped and licensed for use on public roads, while a street legal vehicle is equipped and licensed for use on public roads. These recreational off-highway vehicles are often driven on uneven terrain such as rough roads, steep inclines and declines. As a consequence of these considerations, the design of a recreational off-highway vehicle can be quite different from vehicles designed for driving on paved roads.

Various types of recreational off-highway vehicles that are designed to be primarily driven on unpaved surfaces and typically have one or more seats. One example of a recreational off-highway vehicles is a side-by-side off-road vehicle in which the driver and a passenger are seated side-by-side. Some side-by-side recreational off-road vehicles also have a second row of seats to accommodate one or more additional passengers. These recreational off-highway vehicles typically have a frame with an open cockpit, a roll cage, a steering wheel and four wheels. In the case of these side-by-side recreational off-highway vehicles, a drive source such as an internal combustion engine is utilized to drive one or more of the wheels. Typically, the drive source will be configured to drive two of the wheels or all four of the wheels. Typically, the engine is provided with a transmission that transfers power to an output shaft from the crankshaft of the engine. The output shaft drives the wheels through a drivetrain.

Since the recreational off-highway vehicles are often driven on rough terrains, suspension assemblies are needed that have a large amount of travel to handle the rough terrain. However, as the wheels move up and down in a vertical direction by the suspension assemblies, the wheel orientations also tend to change. For example, the camber and the toe of the wheels may change as the wheels move up and down in the vertical direction. Camber is the extent that the wheel tracks away from perpendicular ground contact through the full suspension stroke, while toe is that the wheel tracks in and/or out away from a vehicle centerline through the full suspension stroke. If the change in camber and/or toe of the wheels are too large, then handling of the recreational off-highway vehicle may be adversely affected. Scrub is the extent that the wheel slips along the ground plane perpendicular to the direction of vehicle travel through full suspension stroke.

SUMMARY

Generally, the present disclosure is directed to various features of a rear suspension assembly of a recreational off-highway vehicle. In driving various recreational off-highway vehicles, it has been found that maintaining a zero toe change and a zero camber change through the full suspension stroke is preferable while also minimizing scrub, which is the extent that the wheels slip along the ground plane perpendicular to the direction of vehicle travel through the full suspension stroke.

Accordingly, one object of the present disclosure is directed to improving a rear suspension assembly of a recreational off-highway vehicle to have a zero toe change, a zero camber" change relative to opposite wheel and a zero scrub change through a full suspension stroke.

In accordance with one aspect of the present disclosure, a recreational off-highway vehicle is provided that basically comprises a vehicle frame, a least one front wheel, a right rear wheel, a left rear wheel, a solid rear axle, a right trailing arm, a left trailing arm, at least one right shock absorber, at least one left shock absorber, a rear differential, a transmission and a motor. The vehicle frame has a front portion, a rear portion and a passenger compartment between the front and rear portions. The front wheels support the front portion of the vehicle frame. The right rear wheel supports a right lateral side of the rear portion of the vehicle frame. The left rear wheel supports a left lateral side of the rear portion of the vehicle frame. The solid rear axle rotatably supports the right and left rear wheels at opposite ends of the solid rear axle. The right trailing arm has a front end pivotally connected to the vehicle frame and a rear end pivotally supporting a right end of the solid rear axle. The left trailing arm has a front end pivotally connected to the vehicle frame and a rear end pivotally supporting a left end of the solid rear axle. At least one right shock absorber is coupled between the vehicle frame and the right trailing arm. At least one left shock absorber is coupled between the vehicle frame and the left trailing arm. The rear differential is supported on the solid rear axle and operatively connected to the left rear wheel and the right rear wheel. The transmission is disposed on the vehicle frame and has a propeller shaft operatively connected to the rear differential to drive the right and left rear wheels via the rear differential. The motor is operatively connected to the transmission. The propeller shaft includes a first drive section and a second drive section that articulates relative to the first drive section. The second drive section is connected to the rear differential.

Also, other features, aspects and advantages of the disclosed recreational off-highway vehicle will become apparent to those skilled in the field of manufacturing recreational off-highway vehicles from the following detailed description, which, taken in conjunction with the annexed drawings, discloses several illustrative embodiments of a recreational off-highway vehicle with various features.

BRIEF DESCRIPTION OF THE DRAWINGS

Referring now to the attached drawings which form a part of this original disclosure.

Figure 1:
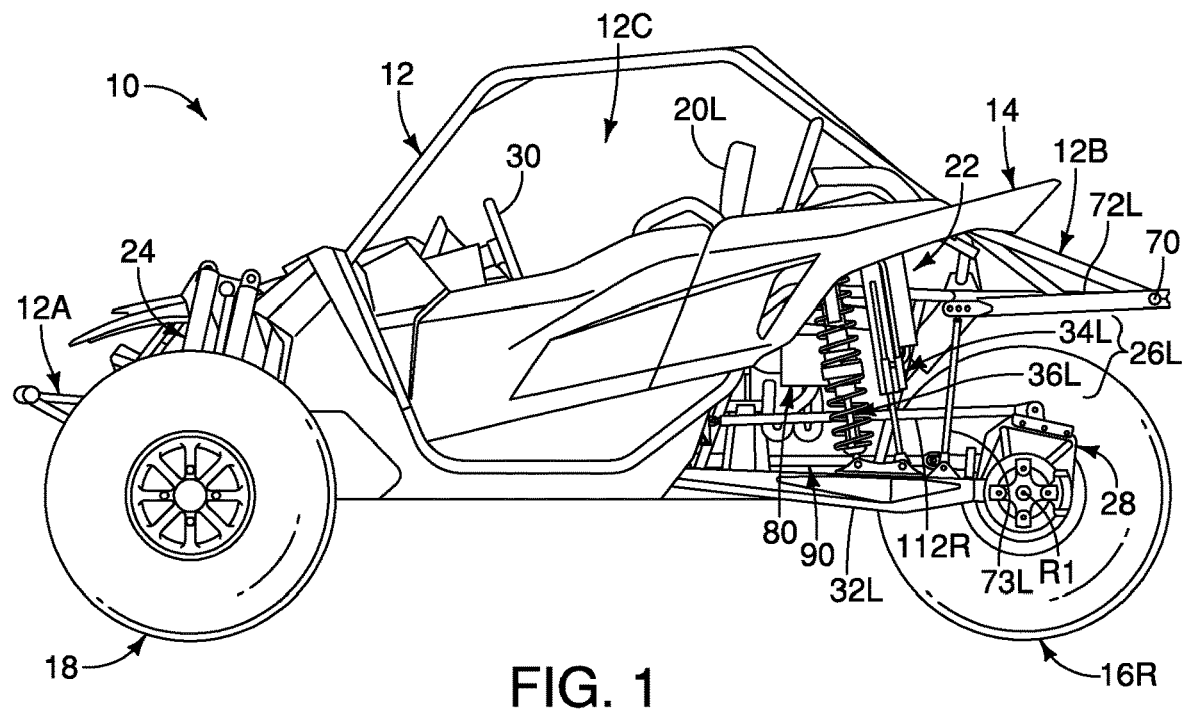
FIG. 1 is a left side elevational view of a recreational off-highway vehicle having a rear suspension assembly with a pair of rear suspensions in accordance with one illustrative embodiment.

It should be noted that these figures are intended to illustrate the general characteristics of methods, structure and/or materials utilized in certain illustrative embodiment and to supplement the written description provided below. These figures are to reduce scale of the actual recreational off-highway vehicle but may not precisely reflect the precise structural or performance characteristics of any given embodiment. However, the dimensional relationships and the arrangement of the parts of the recreational off-highway vehicle are accurately depicted.

DETAILED DESCRIPTION OF EMBODIMENTS

Selected embodiments will now be explained with reference to the drawings. It will be apparent to those skilled in the recreational off-highway vehicle field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Figure 2:
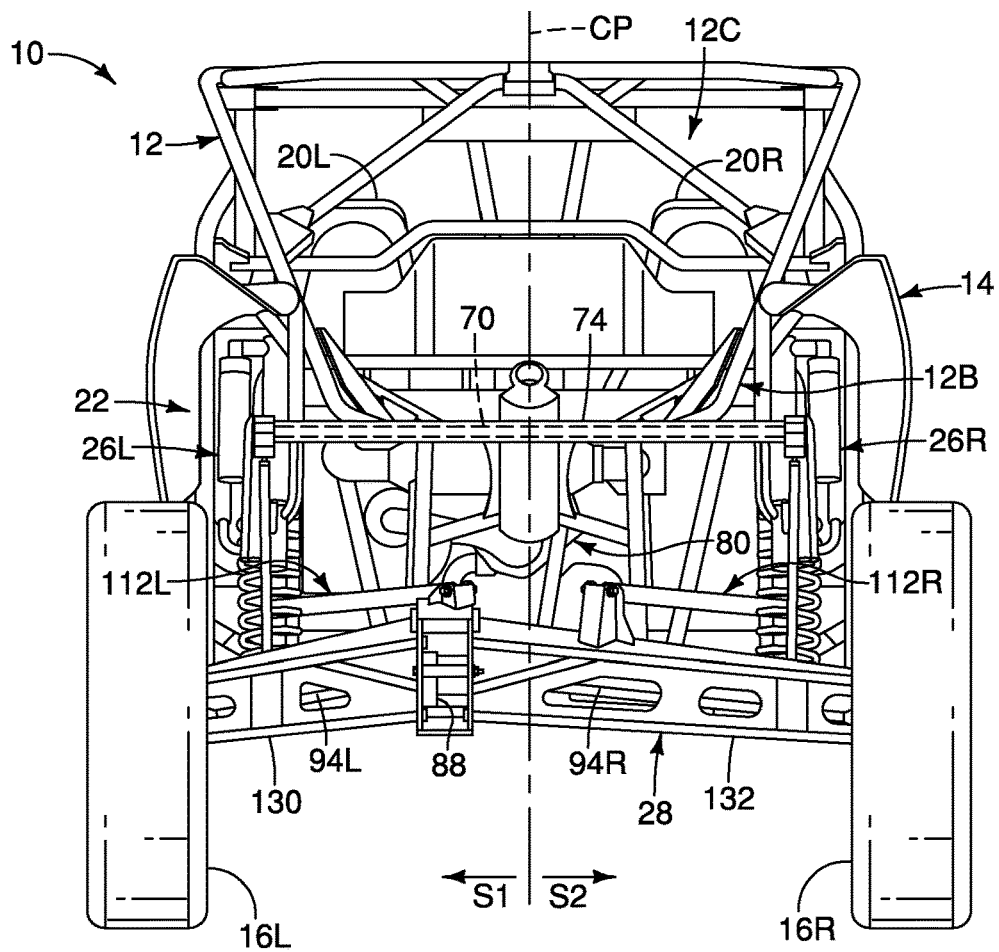
FIG. 2 is a rear end elevational view of the recreational off-highway vehicle illustrated in FIG. 1 in which the rear suspension assembly is in a resting position (1 g of force—the force of gravity at the Earth's surface, which is 9.8 m/s$^2$)
Figure 3:
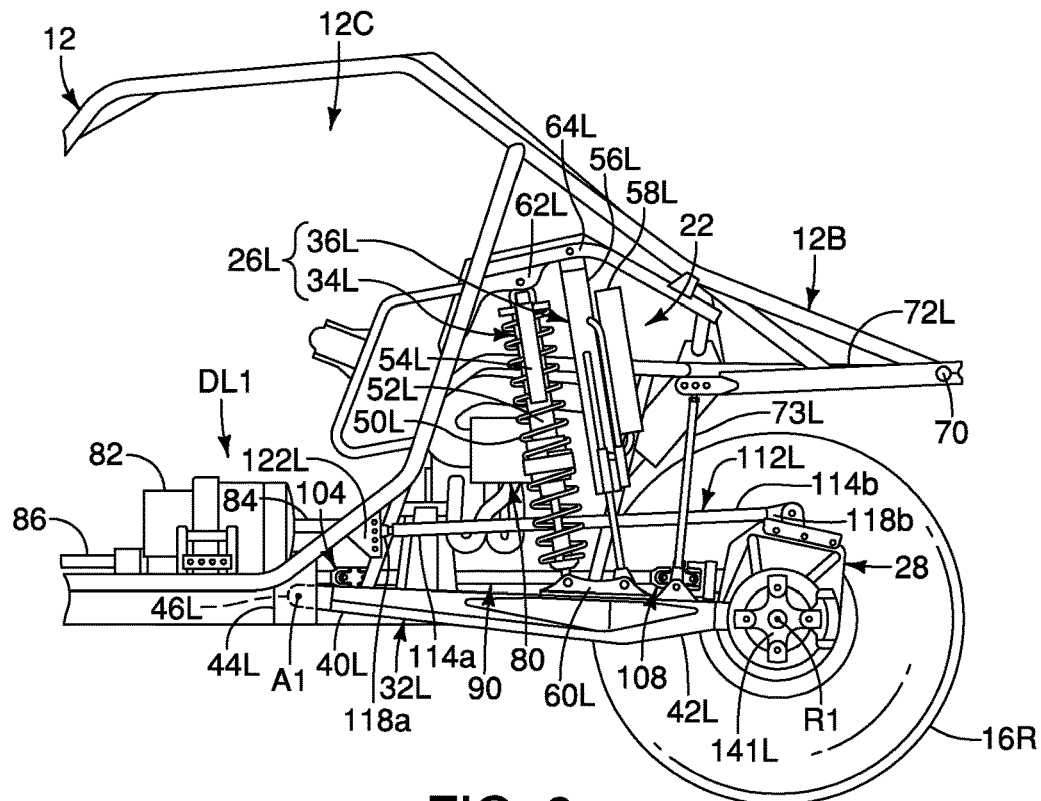
FIG. 3 is a left side elevational view of selected parts of a rear portion of the recreational off-highway vehicle illustrated in FIGS. 1 and 2 corresponding to the resting position (1 g of force)

Referring initially to FIGS. 1 to 3, a recreational off-highway vehicle 10 is illustrated in accordance with one illustrative embodiment. Here, the recreational off-highway vehicle 10 is a side-by-side recreational off-highway vehicle for two people. Generally, as used herein, the term "recreational off-highway vehicle" refers to a vehicle primarily designed for driving on unpaved and uneven surfaces. Of course, recreational off-highway vehicles such as the recreational off-highway vehicle 10 illustrated herein can be also driven on paved surfaces. However, the term "recreational off-highway vehicle" does not include large vehicles that are designed for driving primarily on paved surfaces. Hereinafter, for the sake of brevity, the recreational off-highway vehicle 10 will be referred to simply as the vehicle 10.

In the following description, the terms "front" and "forward" refer to a direction in which the driver looks straight ahead while in seated driving position. Also, in the following description, the terms "rear," "rearward" and "backward" refer to a direction opposite to the front or forward direction. Further in the following description, the term "lateral side" refer to a portion of the vehicle 10 that is one or the other side of a vertical center plane CP that bisect the vehicle 10 into right and left halves. Thus, as seen in FIG. 2, the vertical center plane CP divides the vehicle 10 into a first lateral side S1 (i.e., the left side in the illustrated embodiment) and a second lateral side S2 (i.e., the right side in the illustrated embodiment). The vertical center plane CP extends in a vehicle lengthwise direction as indicated in FIG. 3.

The vehicle 10 basically comprises a vehicle frame 12, a vehicle body 14, a pair of rear wheels 16R and 16L, a pair of front wheels 18 (only the left wheel is shown), a driver seat 20L and a passenger seat 20R. The vehicle body 14, the driver seat 20L and the passenger seat 20R are attached to the vehicle frame 12 in a conventional manner. As seen in FIG. 1, the rear wheels 16R and 16L are connected to the vehicle frame 12 by a rear suspension assembly 22, while the front wheels 18 are connected to the vehicle frame 12 by a front suspension assembly 24. In some applications of the vehicle 10, the vehicle body 14 can be omitted. Also, in some applications of the vehicle 10, only a single front wheel can be provided instead of two front wheels which are used in the illustrated embodiment.

The vehicle frame 12 is typically made from a plurality of hollow tubes and a plurality of brackets that are welded to each other. It is contemplated that at least some of the hollow tubes could be replaced by other types of supports such as solid support members and/or beams. While the hollow tubes have a cylindrical cross-section, it is contemplated that cross-sections other than circular. Preferably, the hollow tubes, the beams and the brackets are preferably made of a suitable rigid metallic material such as steel, aluminum, titanium, etc. It is also contemplated that at least some of the hollow tubes, the beams, and the brackets could be made of a non-metallic material, such as reinforced composite materials such as fiber reinforced plastics. It is also contemplated that at least some of the members and brackets could be joined to each other by means other than welding, such as by fastening and bonding for example. It is also contemplated that two or more of the hollow tubes, the beams, and the brackets described below could be cast or otherwise formed as a single component. It is also contemplated that the vehicle frame 12 could have more or less the hollow tubes, the beams, and the brackets than illustrated below depending on the type of materials used, the required strength and rigidity of the vehicle frame 12 and the weight of the components attached to the vehicle frame 12 for example.

As seen in FIG. 1, the vehicle body 14 is supported by the vehicle frame 12 in a conventional manner. The vehicle frame 12 has a front portion 12A, a rear portion 12B and a passenger compartment 12C between the front and rear portions 12A and 12B. The left rear wheel 16L supports a left lateral side S1 of the rear portion 12B of the vehicle frame 12. The right rear wheel 16R supports a right lateral side S2 of the rear portion 12B of the vehicle frame 12. The front wheels 18 support the front portion 12A of the vehicle frame 12. The vertical center plane CP is equally spaced from the left and right rear wheels 16L and 16R.

In the illustrated embodiment, as seen in FIG. 2, the driver seat 20L is disposed in the passenger compartment 12C on the first lateral side S1 (the left side) of the vehicle 10, while the passenger seat 20R in the passenger compartment 12C is disposed on the second lateral side S2 (the right side) of the vehicle 10. However, it is contemplated that the driver seat 20L could be disposed on the right side of the vehicle 10 and that the passenger seat 20R could be disposed on the left side of the vehicle 10.

The vehicle body 14 includes a plurality of body panels that are connected the vehicle frame 12. The body panels of the vehicle body 14 aid in protecting various components of the vehicle 10 and provide some of the aesthetic features of the vehicle 10. In some applications of the vehicle 10, the vehicle body 14 can be omitted. Since the body panels of the vehicle body 14 does not directly affect the rear suspension assembly 22, the body panels of the vehicle body 14 will not be discussed and/or illustrated in detail herein.

As seen in FIG. 1, the front wheels 18 support the front portion 12A of the vehicle frame 12 via the front suspension assembly 24. The front suspension assembly 24 can be any type of suspension as needed and/or desired. Here, the front suspension assembly 24 includes a pair of double A-arm suspensions that each includes a lower A-arm, an upper A-arm and a pair of shock absorbers. The front suspensions are swingably (up and down) relative to the vehicle frame 12, and independently suspend the associated one of the front wheels 18. The front suspensions are basically a mirror images of each other. Since double A-arm suspension assemblies of this type are well known, the front suspension assembly 24 will not be described in greater detail for the sake of brevity.

As seen in FIGS. 2 and 3, the right and left rear wheels 16R and 16L support the rear portion 12B of the vehicle frame 12 via the rear suspension assembly 22. In the illustrated embodiment, the rear suspension assembly 22 includes a right rear suspension 26R, a left rear suspension 26L and a solid rear axle 28. Each of the right and left rear suspensions 26R and 26L is swingably (up and down) relative to the vehicle frame 12. The solid rear axle 28 rotatably supports the right and left rear wheels 16R and 16L at opposite ends of the solid rear axle 28.

As seen in FIG. 1, the vehicle 10 further comprises a steering wheel 30 is that is disposed in front of the driver seat 20L. The steering wheel 30 is operatively connected to the front wheels 18 by a steering column in a conventional manner for turning the front wheels 18 in response to turning of the steering wheel 30. In some applications, a control stick can be used in place of the steering wheel 30. Other suitable steering devices also can be used, such as, without limitation, a handlebar, one or more push-buttons, one or more foot pedals and/or the like. Thus, here, the front wheels 18 are steerable wheels for changing the travel path of the vehicle 10.

Preferably, the vehicle 10 is a four-wheel drive vehicle in which both the front wheels 18 and the right and left rear wheels 16R and 16L are drive wheels for propelling the vehicle 10 along the ground. Of course, it will be apparent from this disclosure that only the right and left rear wheels 16R and 16L can be drive wheels.

Turning to FIGS. 2-7, the right and left rear suspensions 26R and 26L will be discussed in more detail. The right and left rear suspensions 26R and 26L are shown in a resting position. Here, the terms "rest position" and "resting position" with respect to the right and left rear suspensions 26R and 26L refers to the vehicle 10 being supported by the right and left rear suspensions 26R and 26L with a 1 g of force (i.e., the force of gravity at the Earth's surface, which is 9.8 m/s$^2$). Here, in the illustrated embodiment, the toe angles and the camber angles of the right and left rear wheels 16R and 16L are preset to zero and controlled through full suspension stroke to maintain zero toe and zero camber. However, it will be apparent that the toe angles and the camber angles of the right and left rear wheels 16R and 16L can be preset to a predetermined value other than zero and can be controlled through full suspension stroke to maintain the predetermined value.

Figure 4:
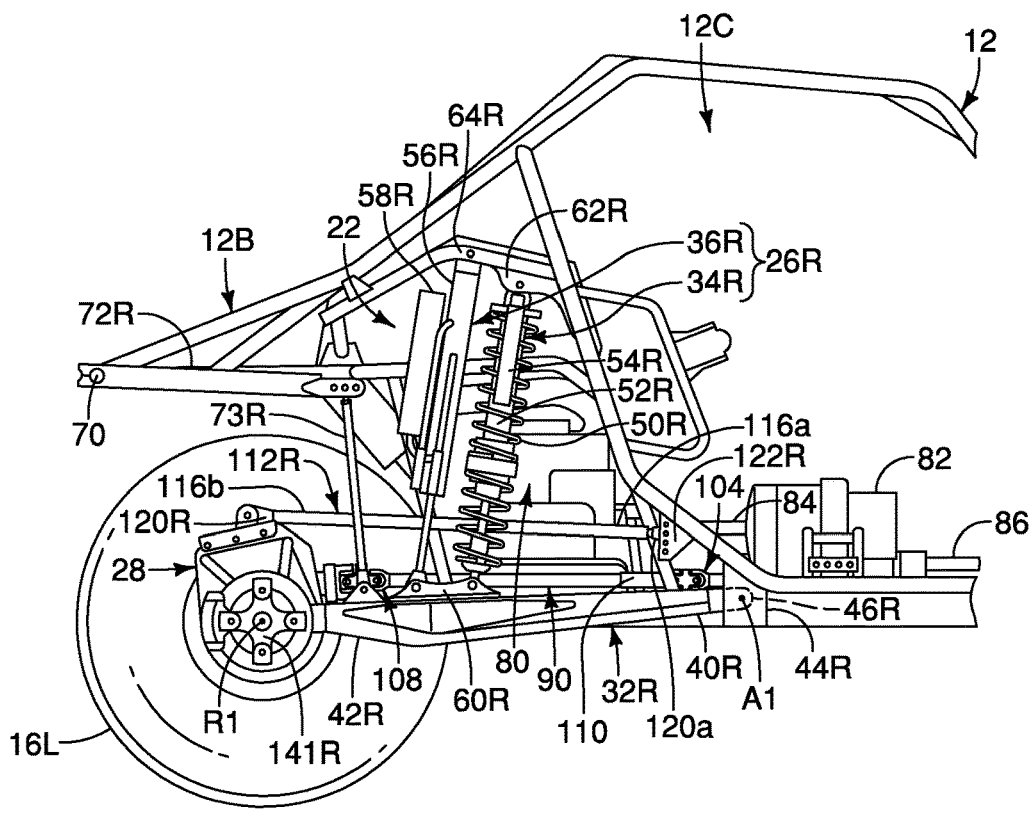
FIG. 4 is a right side elevational view of the selected parts of the rear portion of the recreational off-highway vehicle illustrated in FIG. 3 corresponding to the resting position (1 g of force)

Basically, as seen in FIGS. 3 and 4, the right rear suspension 26R includes a right trailing arm 32R, a first right shock absorber 34R and a second right shock absorber 36R. Similarly, the left rear suspension 26L includes a left trailing arm 32L, a first left shock absorber 34L and a second left shock absorber 36L. The right and left rear suspensions 26R and 26L are trailing arm suspensions with dual shock absorbers. The right rear suspension 26R is a mirror image of the left rear suspension 26L.

The right trailing arm 32R and the left trailing arm 32L are preferably made of a suitable rigid metallic material such as steel, aluminum, titanium, etc. It is also contemplated that the right trailing arm 32R and the left trailing arm 32L could be made of a non-metallic material, such as reinforced composite materials such as fiber reinforced plastics. The right trailing arm 32R has a front end 40R that is pivotally connected to the vehicle frame 12 and a rear end 42R that is pivotally supporting a right end of the solid rear axle 28. The left trailing arm 32L has a front end 40L that is pivotally connected to the vehicle frame 12 and a rear end 42L that is pivotally supporting a left end of the solid rear axle 28.

Figure 18:
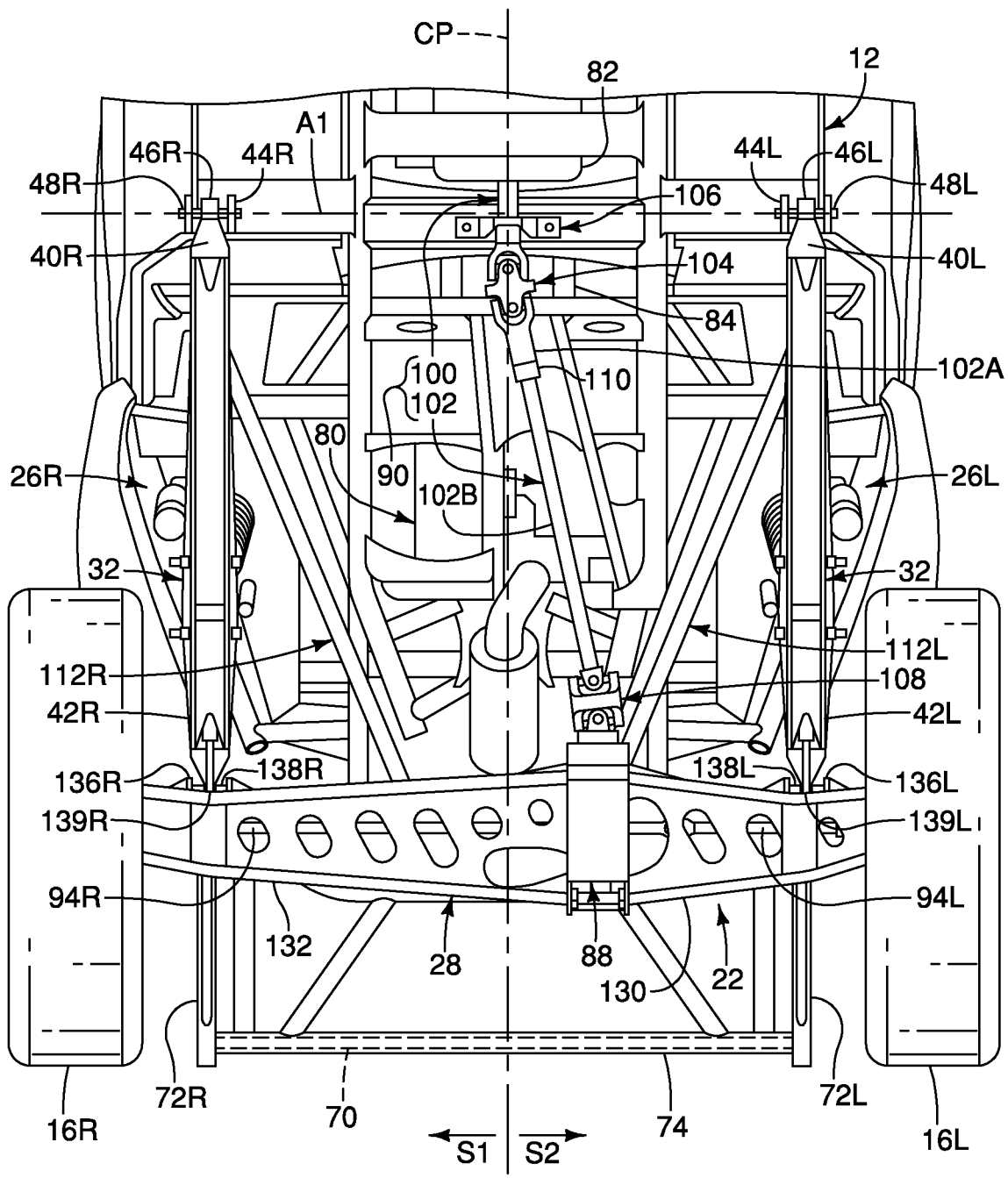
FIG. 18 is a bottom view of selected parts of the rear portion of the recreational off-highway vehicle showing the rear suspension assembly in the resting position (1 g of force)

More specifically, as seen in FIG. 18, the vehicle frame 12 has a pair of trailing arm mounts 44R and 44L that pivotally supports the front ends 40R and 40L of the right and left trailing arms 32R and 32L about a front pivot axis A1. Here, the front end 40R of the right trailing arm 32R includes a mechanical articulating joint 46R, while the front end 40L of the left trailing arm 32L includes a mechanical articulating joint 46L. The mechanical articulating joints 46R and 46L are, for example, a Heim joint or spherical bearing that has a casing with a ball swivel movably supported therein and a threaded shaft attached thereto. The ball swivels of the mechanical articulating joints 46R and 46L each has an opening through which a bolt or other attaching hardware passes. Here, a bolt 48R passes through the opening in the ball swivel of the mechanical articulating joint 46R to pivotally connect the front end 40R of the right trailing arm 32R to the trailing arm mount 44R of the vehicle frame 12. Likewise, a bolt 48L passes through the opening in the ball swivel of the mechanical articulating joint 46L to pivotally connect the front end 40L of the left trailing arm 32L to the trailing arm mount 44L of the vehicle frame 12. The mechanical articulating joints 46R and 46L provide multiple degrees of freedom of movement. Since mechanical articulating joints are well known, the mechanical articulating joints 46R and 46L will not be discussed herein.

While the right and left rear suspensions 26R and 26L each includes two shock absorbers in the illustrated embodiment, it will be apparent from this disclosure that each of the right and left rear suspensions 26R and 26L includes at least one shock absorber. In other words, at least one right shock absorber is coupled between the vehicle frame 12 and the right trailing arm 32R, and at least one left shock absorber is coupled between the vehicle frame 12 and the left trailing arm 32L. However, preferably, the first and second right shock absorbers 34R and 36R are coupled between the vehicle frame 12 and the right trailing arm 32R, while the first and second left shock absorbers 34L and 36L are coupled between the vehicle frame 12 and the right trailing arm 32R coupled between the vehicle frame 12 and the left trailing arm 32L.

As seen in FIGS. 3 and 4, the first right and left shock absorbers 34R and 34L are coil-over internal bypass shock absorbers. The first right shock absorbers 34R has dual coil springs 50R, a shock 52R extending inside of the coil springs 50R and a reservoir 54R fluidly connected to the shock 52R. Likewise, the first left shock absorbers 34L has dual coil springs 50L, a shock 52L extending inside of the coil springs 50L and a reservoir 54L fluidly connected to the shock 52L. The second right and left shock absorbers 36R and 36L are external bypass shock absorbers. The second right shock absorber 36R has a shock 56R fluidly connected to a reservoir 58R, while the second left shock absorber 36L has a shock 56L fluidly connected to a reservoir 58L. The shock absorbers 34R, 34L, 36R and 36L are nitrogen charged shock absorbers. The first right and left shock absorbers 34R and 34L use the springs 50R and 50L, respectively, to hold up the vehicle 10 while providing broad secondary damping characteristics. The second right and left shock absorbers 36R and 36L provide primary damping through use of multiple externally adjustable bypass tubes occupying space where typically a spring would be used. Thus, the first right and left shock absorbers 34R and 34L have a first damping characteristic, while the second right and left shock absorbers 36R and 36L have a second damping characteristic. The second damping characteristics of the second right and left shock absorbers 36R and 36L are different from the first damping characteristics of the first right and left shock absorbers 34R and 34L.

The lower ends of the first and second right shock absorbers 34R and 36R are pivotally connected to a shock absorber mount 60R that is provided on the right trailing arm 32R, while the upper ends of the first and second right shock absorbers 34R and 36R are pivotally connected to the shock absorber mounts 62R and 64R that are provided on the vehicle frame 12. The lower ends of the first and second left shock absorbers 34L and 36L are pivotally connected to a shock absorber mount 60L that is provided on the left trailing arm 32L, while the upper ends of the first and second left shock absorbers 34L and 36L are pivotally connected to the shock absorber mounts 62L and 64L that are provided on the vehicle frame 12. The lower and upper ends of the shock absorbers 34R, 36R, 34L and 36L can be mounted in any appropriate manner, such as but not limited to mechanical fasteners (with or without bushings) that can permit preferably provide at least two degrees of freedom of movement of the shock absorbers 34R, 36R, 34L and 36L relative to each of the left trailing arms 32R and 32L and the vehicle frame 12.

Figure 5:
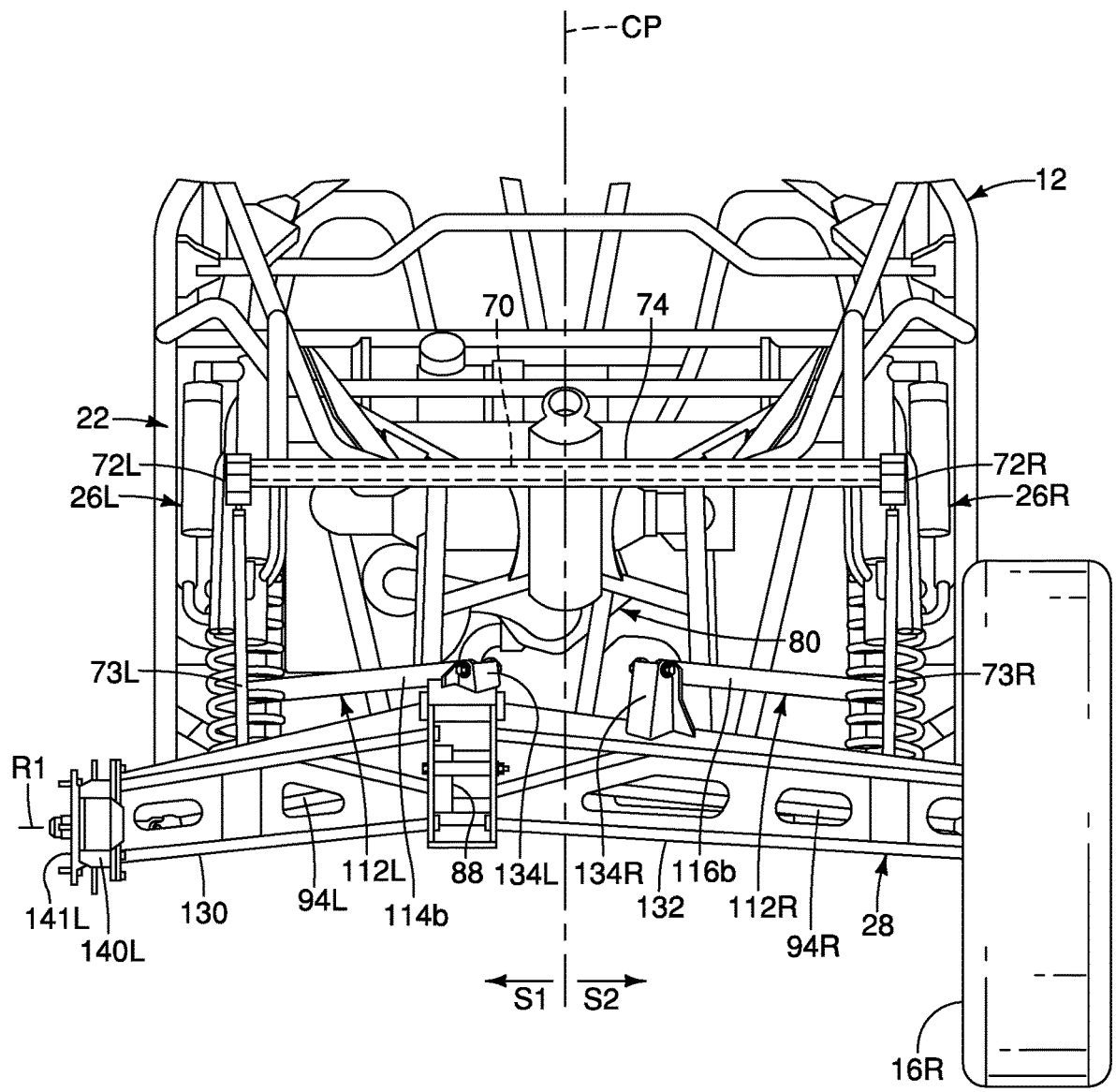
FIG. 5 is a rear end elevational view of selected parts of the rear portion of the recreational off-highway vehicle illustrated in FIGS. 1 and 2 corresponding to the resting position (1 g of force)
Figure 6:
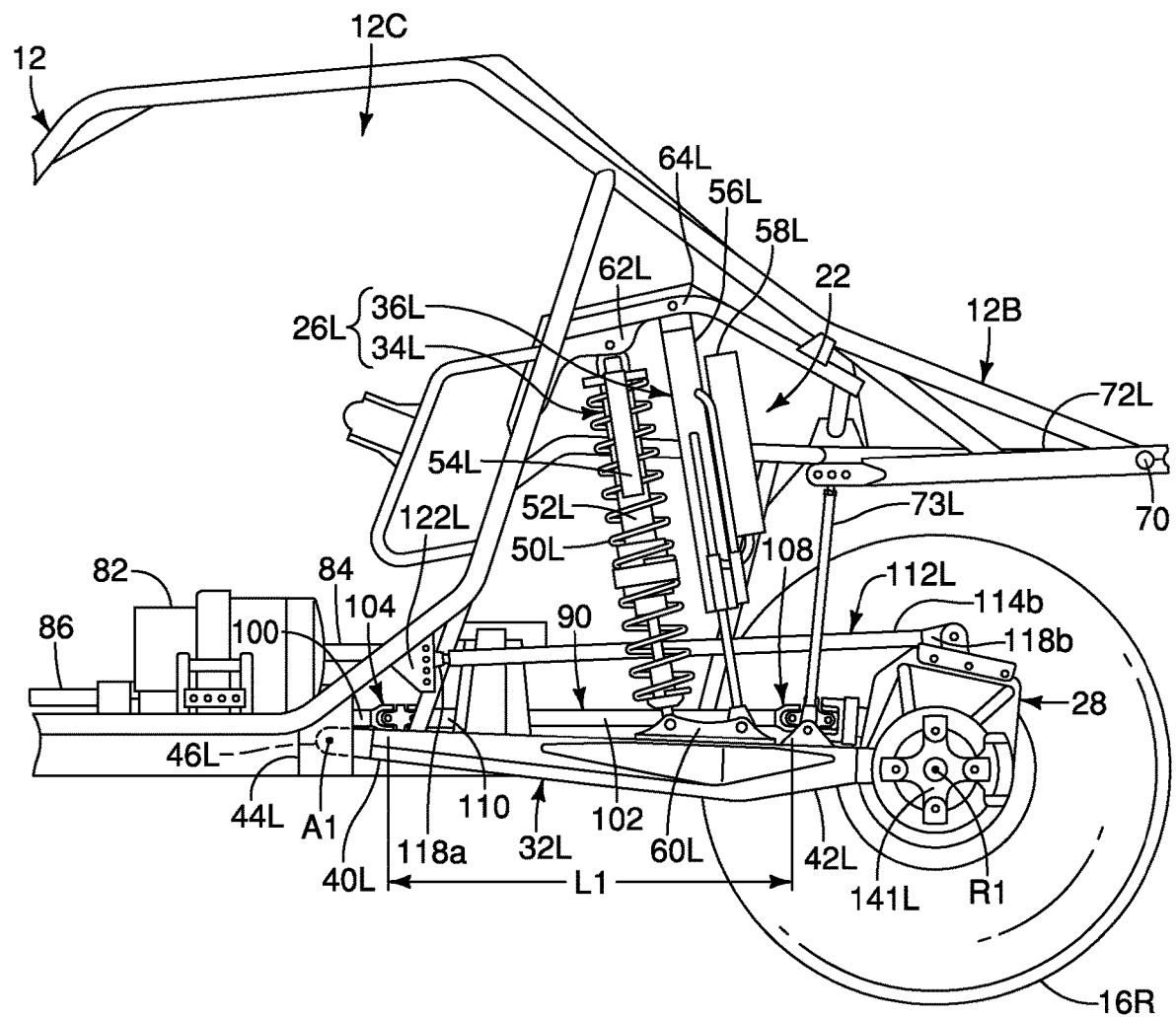
FIG. 6 is a left side elevational view, similar to FIG. 3, of selected parts of the rear portion of the recreational off-highway vehicle, but with the engine removed, and showing the rear suspension assembly in the resting position (1 g of force)
Figure 7:
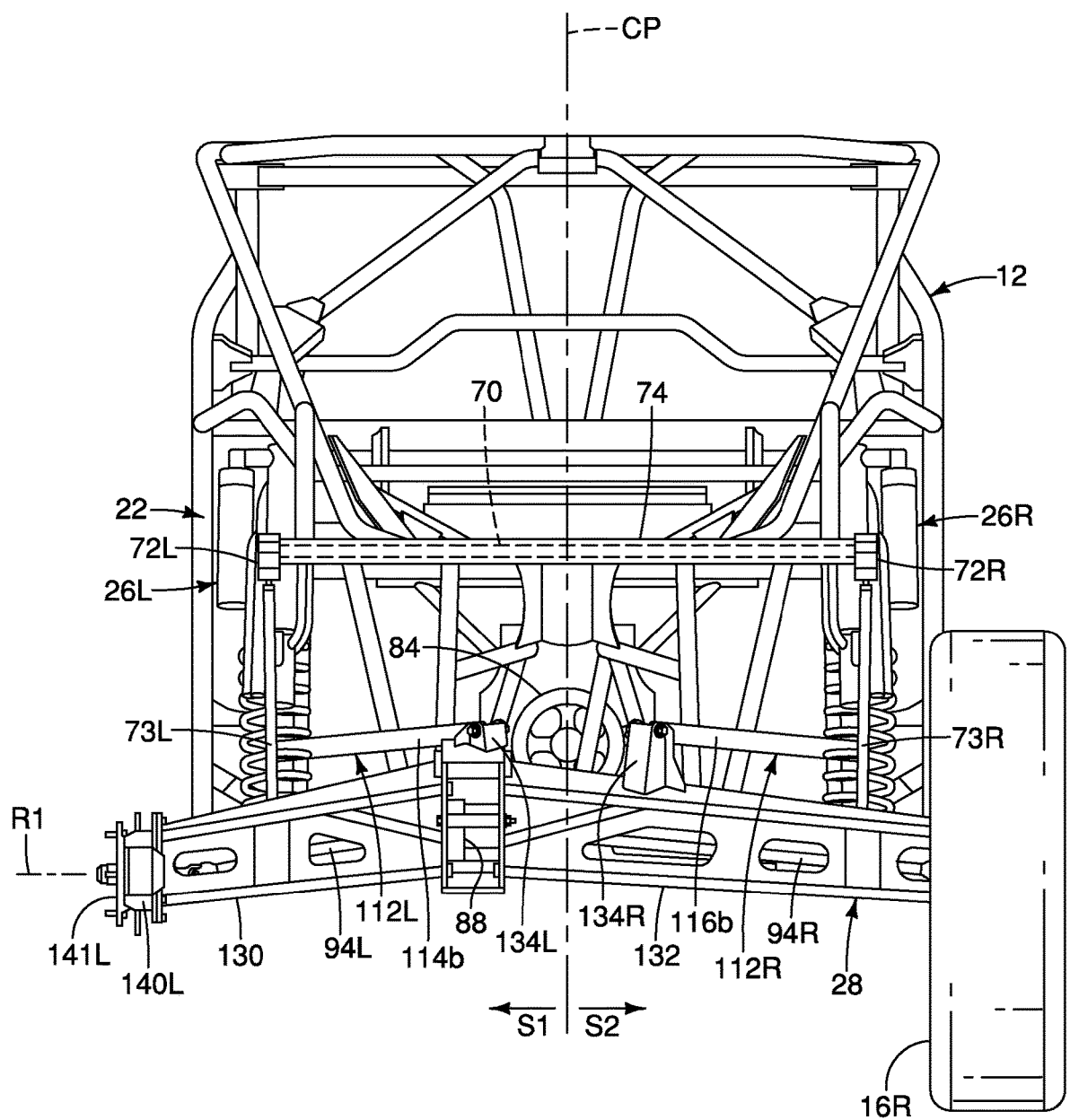
FIG. 7 is a rear end elevational view, similar to FIG. 5, of selected parts of the rear portion of the recreational off-highway vehicle, but with the engine removed, and showing the rear suspension assembly in the resting position (1 g of force)

Referring to FIGS. 5 and 7, the vehicle 10 further comprises a sway bar 70, a right arm 72R, a left arm 72L, a right link 73R and a left link 73L. The sway bar 70, the right arm 72R, the left arm 72L, the right link 73R and the left link 73L are preferably made of a suitable rigid metallic material such as steel, aluminum, titanium, etc. It is also contemplated that the sway bar 70, the right arm 72R, the left arm 72L, the right link 73R and the left link 73L could be made of a non-metallic material, such as reinforced composite materials such as fiber reinforced plastics.

Figure 15:
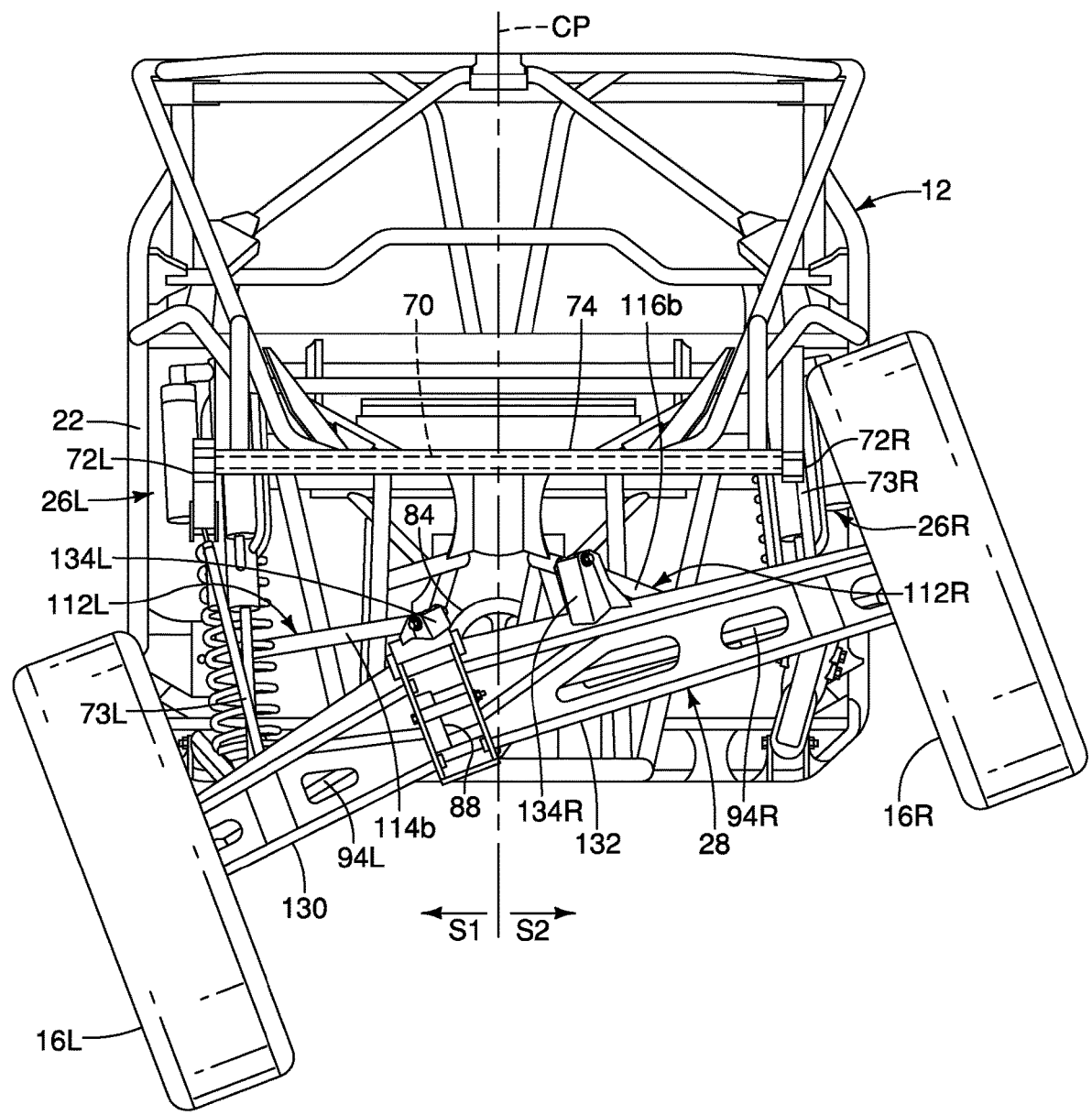
FIG. 15 is a rear end elevational view of selected parts of the rear portion of the recreational off-highway vehicle, but with the right rear suspension in the full compression position and the left rear suspension in an extended position.
Figure 16:
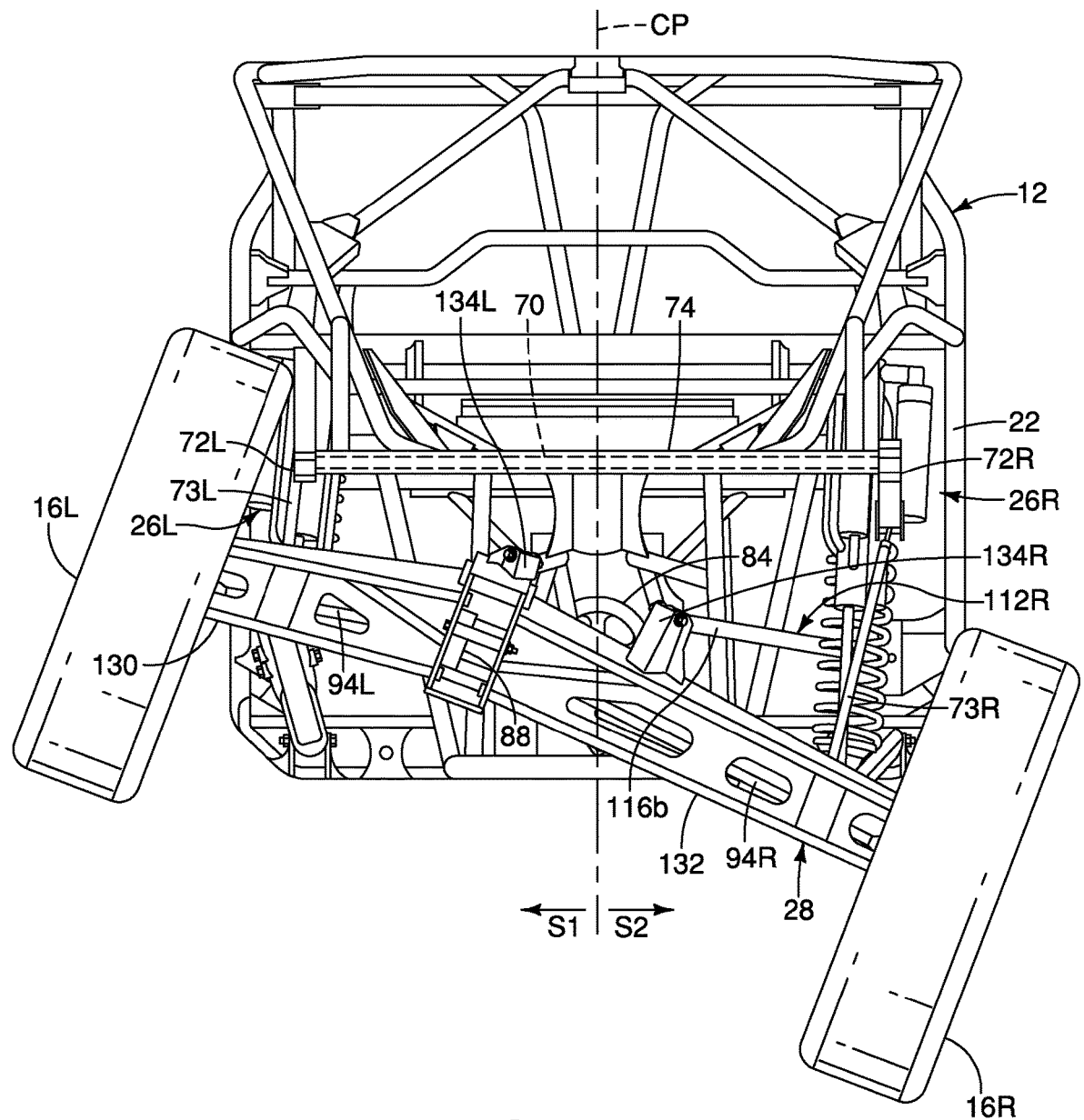
FIG. 16 is a rear end elevational view of selected parts of the rear portion of the recreational off-highway vehicle, but with the left rear suspension in the full compression position and the right rear suspension in an extended position.

The sway bar 70 is disposed inside an integral frame tube 74 of the vehicle frame 12 that is located rearward of rotational axes R1 of the right and left rear wheels 16R and 16L. The right arm 72R is fixed to a right end of the sway bar 70. The left arm 72L is fixed to a left end of the sway bar 70. Thus, the sway bar 70, the right arm 72R and the left arm 72L are non-movably fixed to each other, but the right arm 72R and the left arm 72L move relative to each other as the sway bar 70 twists as shown in FIGS. 15 and 16. The sway bar 70 is free to pivot inside the integral frame tube 74 as the right trailing arm 32R and the left trailing arm 32L move up or down. Alternatively, the sway bar 70 is pivotally mounted adjacent to a frame tube of the vehicle frame 12. In particular, movement of the right trailing arm 32R and the left trailing arm 32L is transmitted to the sway bar 70, the right arm 72R and the left arm 72L via the right and left links 73R and 73L.

Specifically, the right link 73R has a first end pivotally coupled to the right arm 72R and a second end pivotally coupled to the right trailing arm 32R. The left link 73L has a first end pivotally coupled to the left arm 72L and a second end pivotally coupled to the left trailing arm 32L. Preferably, the right link 73R and the left link 73L are adjustably connected to the right arm 72R and the left arm 72L, respectively. However, the right link 73R and the left link 73L can have a preset length that is non-adjustable as needed and/or desired.

Figure 8:
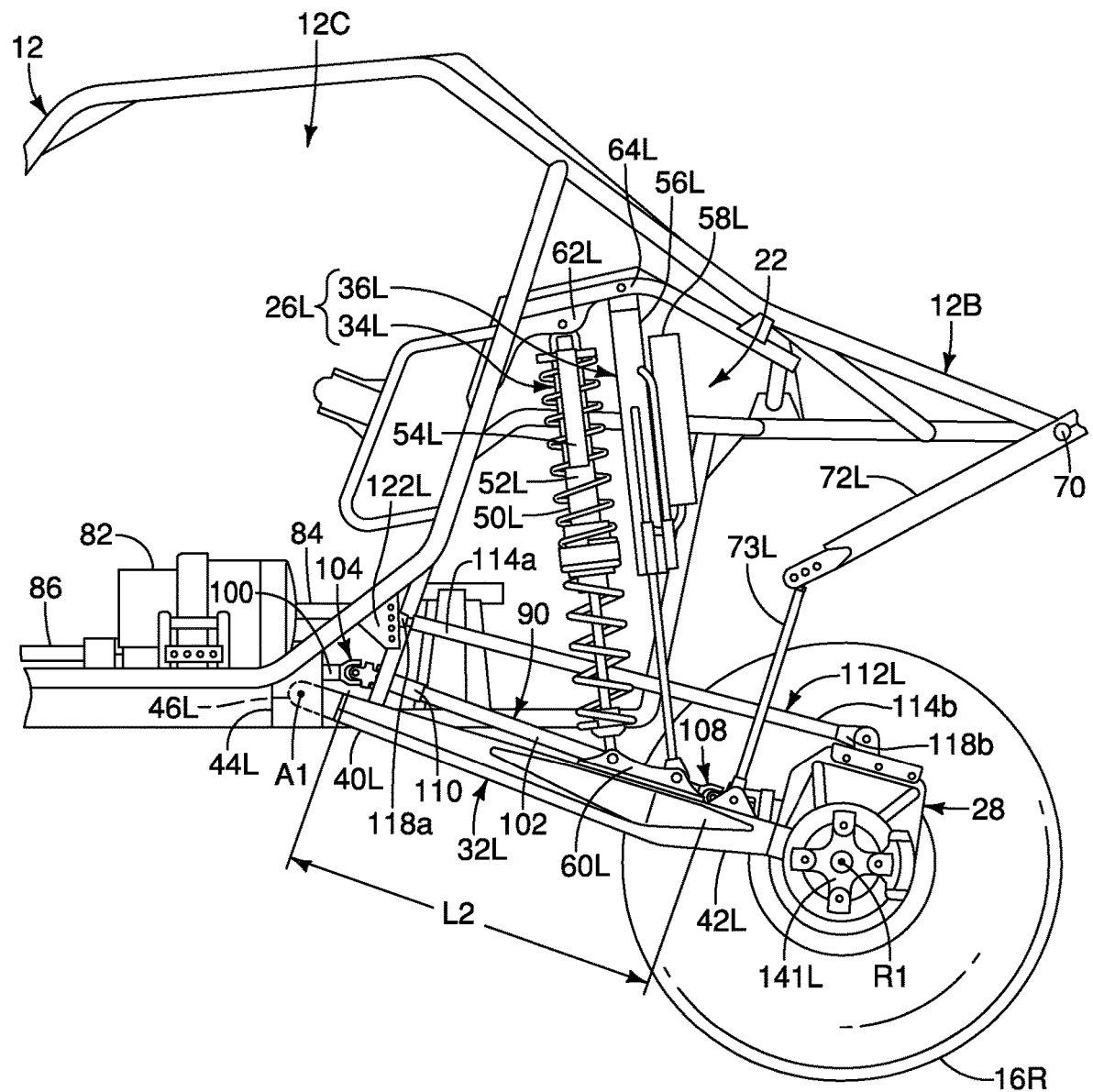
FIG. 8 is a left side elevational view, similar to FIG. 6, of selected parts of the rear portion of the recreational off-highway vehicle but with the rear suspension assembly in a full extension position.
Figure 9:
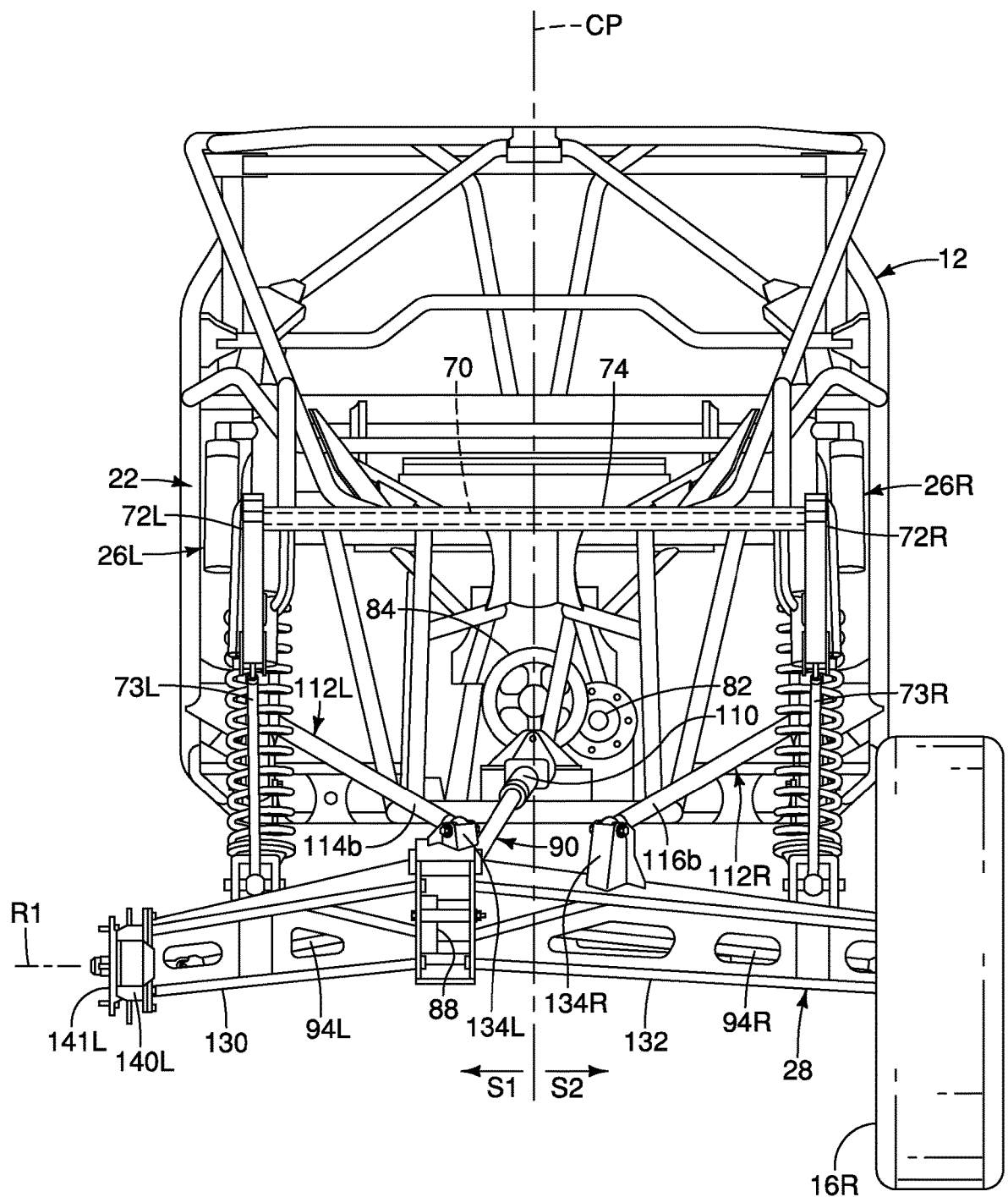
FIG. 9 is a rear end elevational view, similar to FIG. 7, of selected parts of the rear portion of the recreational off-highway vehicle but with the rear suspension assembly in the full extension position.

Turning to FIGS. 8 and 9, the right and left rear suspensions 26R and 26L are illustrated in full extension positions. In other words, the right and left rear suspensions 26R and 26L are extended to their maximum extent. The full extension positions of the right and left rear suspensions 26R and 26L can be established by one or more limit straps (not shown) that are connected between the vehicle frame 12 and the right and left trailing arms 32R and 32L. Alternatively, the full extension positions of the right and left rear suspensions 26R and 26L can be established by either the first shock absorbers 34R and 34L reaching a maximum extension amount or the second shock absorbers 36R and 36L reaching a maximum extension amount.

Here, as seen in FIG. 9, the right and left rear suspensions 26R and 26L are configured to maintain the right and left rear wheels 16R and 16L with a zero toe and a zero camber at the full extension positions. In other words, as seen in FIG. 9, the toe angles of the right and left rear wheels 16R and 16L at the full extension positions of the right and left rear suspensions 26R and 26L do not change from the toe angles of the right and left rear wheels 16R and 16L at the rest positions (1 g positions) of the right and left rear suspensions 26R and 26L. Likewise, as seen in FIG. 9, the camber angles of the right and left rear wheels 16R and 16L at the full extension positions of the right and left rear suspensions 26R and 26L do not change from the camber angles of the right and left rear wheels 16R and 16L at the rest positions (1 g positions) of the right and left rear suspensions 26R and 26L.

Figure 10:
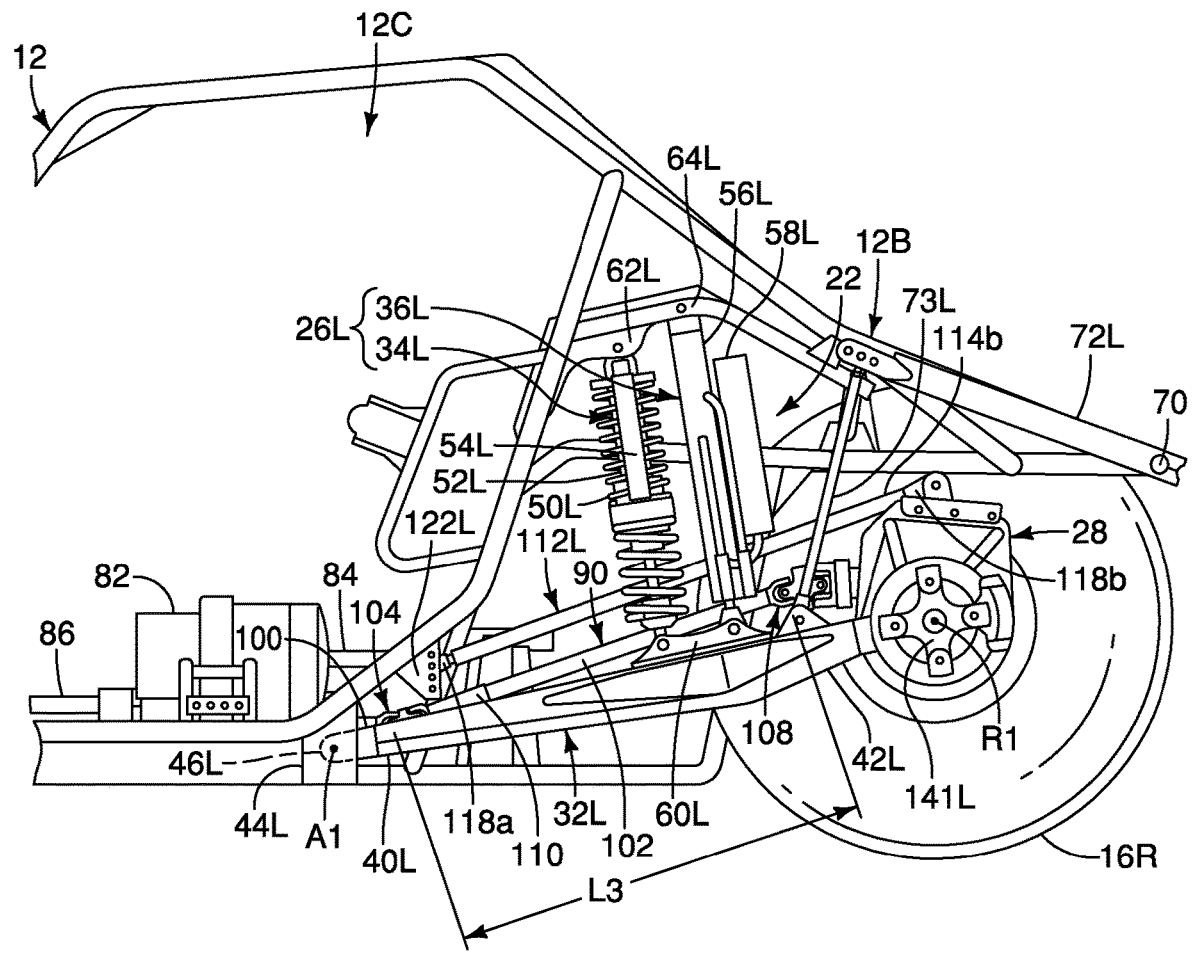
FIG. 10 is a left side elevational view, similar to FIGS. 6 and 8, of selected parts of the rear portion of the recreational off-highway vehicle but with the rear suspension assembly in a full compression position.
Figure 11:
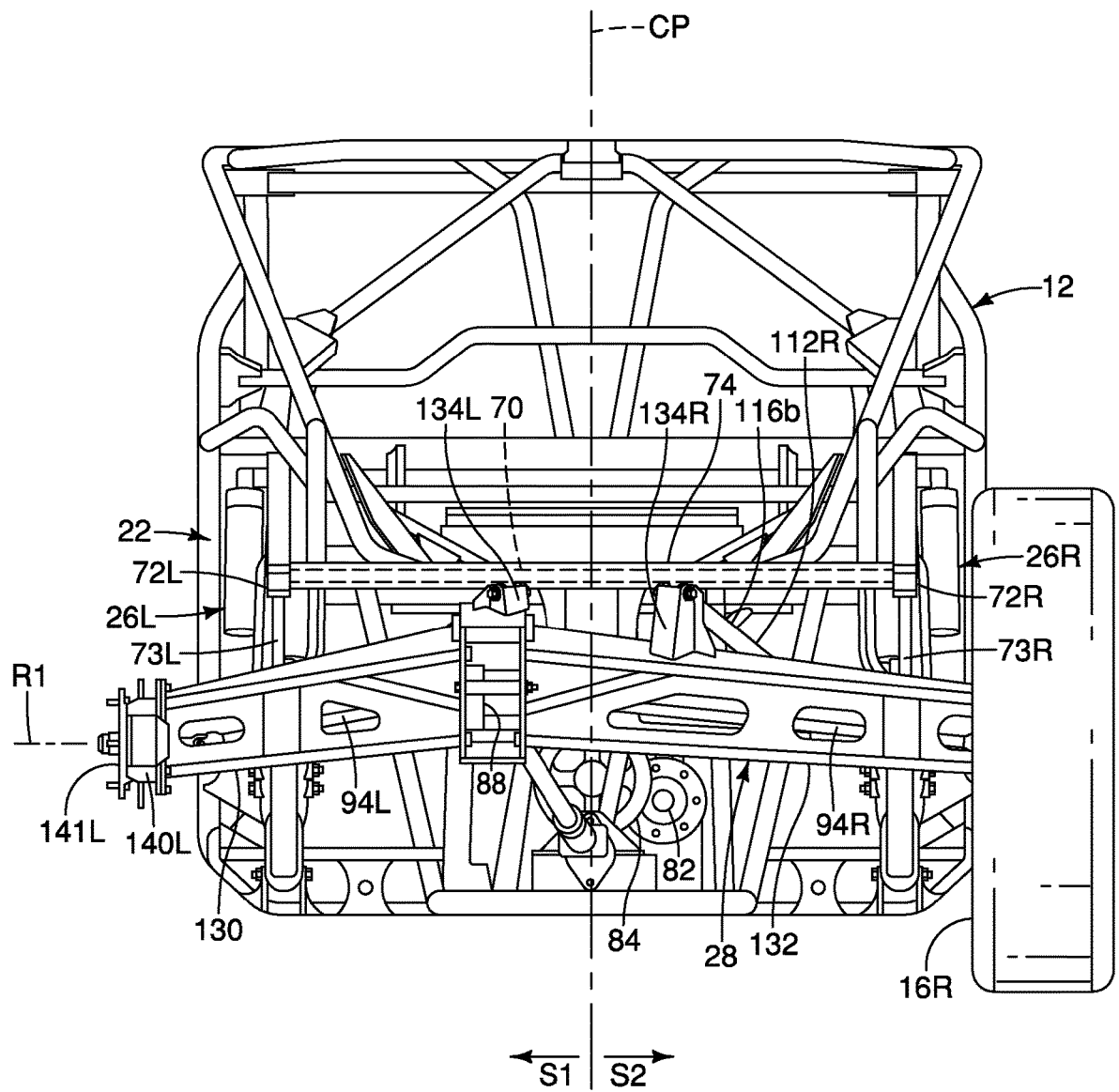
FIG. 11 is a rear end elevational view, similar to FIGS. 7 and 9, of selected parts of the rear portion of the recreational off-highway vehicle but with the rear suspension assembly in the full compression position.

Turning to FIGS. 10 and 11, the right and left rear suspensions 26R and 26L are illustrated in full compression positions. In other words, the right and left rear suspensions 26R and 26L are retracted to their maximum compression. The full compression positions of the right and left rear suspensions 26R and 26L can be established by either the first shock absorbers 34R and 34L reaching a maximum compression amount or the second shock absorbers 36R and 36L reaching a maximum compression amount. Here, as seen in FIG. 11, the right and left rear suspensions 26R and 26L are configured to maintain the right and left rear wheels 16R and 16L with a zero toe and a zero camber at the full compression positions. In other words, as seen in FIG. 11, the toe angles of the right and left rear wheels 16R and 16L at the full compression positions of the right and left rear suspensions 26R and 26L do not change from the toe angles of the right and left rear wheels 16R and 16L at the rest positions (1 g positions) of the right and left rear suspensions 26R and 26L. Likewise, as seen in FIG. 11, the camber angles of the right and left rear wheels 16R and 16L at the full compression positions of the right and left rear suspensions 26R and 26L do not change from the camber angles of the right and left rear wheels 16R and 16L at the rest positions (1 g positions) of the right and left rear suspensions 26R and 26L.

Now, a powertrain of the vehicle 10 will be briefly discussed as it relates to the movement, the arrangement and/or the construction of the rear suspension assembly 22. The vehicle 10 comprises a motor 80 that is attached to the vehicle frame 12 in the rear portion 12B of the vehicle frame 12. Here, the motor 80 is an internal combustion engine. Alternatively, the motor 80 can be an electric motor. The motor 80 is operatively connected to a transmission 82 that is located forward of the motor 80. The motor 80 is disposed rearward of the transmission 82. Also, the motor 80 is located rearward of the seats 20R and 20L that are in the passenger compartment 12C.

The transmission 82 is disposed on the vehicle frame 12. Here, the transmission 82 is preferably disposed along the vertical center plane CP of the vehicle 10 that is equally spaced from the left and right rear wheels 16L and 16R. Preferably, for example, the transmission 82 is a sequential multi-speed manual transmission. Alternatively, the transmission 82 can be a CVT belt transmission with a propeller shaft running to a centrally located transfer case, or an automatic transmission having a torque converter. The transmission 82 is operatively connected to the motor 80 by an output shaft 84 (shown in FIG. 3). The transmission 82 is operatively coupled to both the front wheels 18 and the right and left rear wheels 16R and 16L. The transmission 82 transmits torque to the front wheels 18 via a propeller shaft 86. Since the transmission of torque to the front wheels 18 does not directly affect the rear suspension assembly 22, the transmission of torque to the front wheels 18 will not be discussed and/or illustrated in detail herein. Rather, the transmission of torque to the front wheels 18 from the transmission 82 can be carried out using conventional techniques. The transmission 82 also transmits torque to the right and left rear wheels 16R and 16L via a rear differential 88. Thus, the rear differential 88 is operatively connected to the left rear wheel 16L and the right rear wheel 16R. In other words, the transmission 82 is operatively connected to the rear differential 88 which in turn is operatively connected to the left rear wheel 16L and the right rear wheel 16R for supply torque to the right and left rear wheels 16R and 16L.

The transmission 82 is operatively connected to the rear differential 88 by a propeller shaft 90 to drive the right and left rear wheels 16R and 16L via the rear differential 88. The transmission 82 transmits torque from the motor 80 to the rear differential 88 via the propeller shaft 90. Thus, the motor 80 operatively is connected to the rear differential 88 to drive the right and left rear wheels 16R and 16L via the rear differential 88. As illustrated in FIG. 3, the motor 80 is disposed between the transmission 82 and the rear differential 88.

The rear differential 88 is supported on the solid rear axle 28. The rear differential 88 is preferably disposed at a location laterally offset from the vertical center plane CP. Alternatively, the rear differential 88 can be located on the vertical center plane CP. The rear differential 88 operatively connects to the left rear wheel 16L and the right rear wheel 16R. In particular, the rear differential 88 has a left output axle 92L and a right output axle 92R. The left output axle 92L is operatively connected to the left rear wheel 16L via a left drive shaft 94L. The right output axle 92R is operatively connected to the right rear wheel 16R via a right drive shaft 94R.

Figure 24:
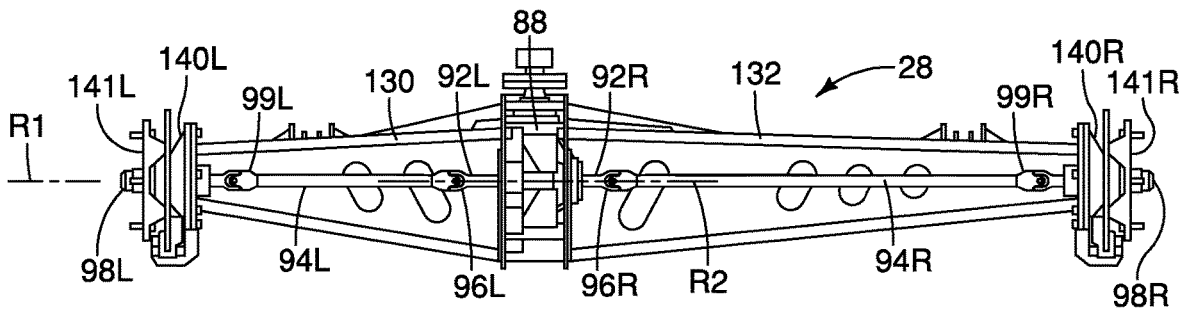
FIG. 24 is a top plan view, similar to FIG. 23, of the rear axle assembly of the rear suspension assembly illustrated in FIGS. 21 to 23 but with a portion of the rear axle broken away.
Figure 25:
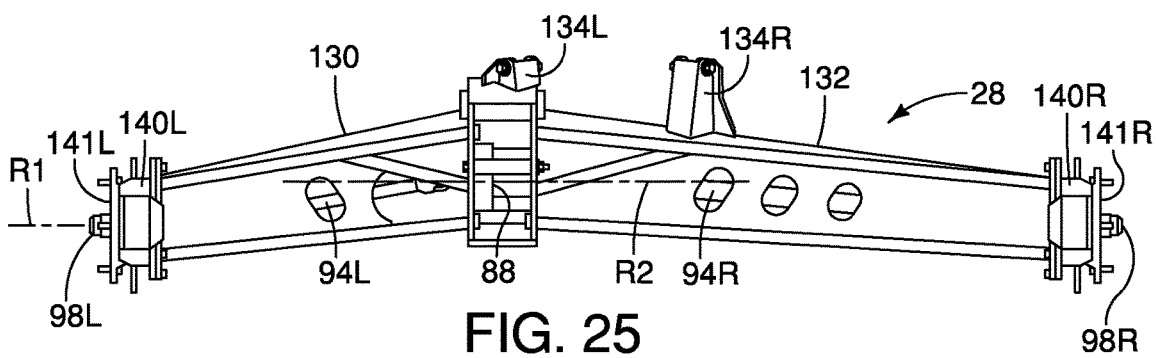
FIG. 25 is a rear side elevational view of the rear axle assembly of the rear suspension assembly illustrated in FIGS. 21 to 24.
Figure 26:
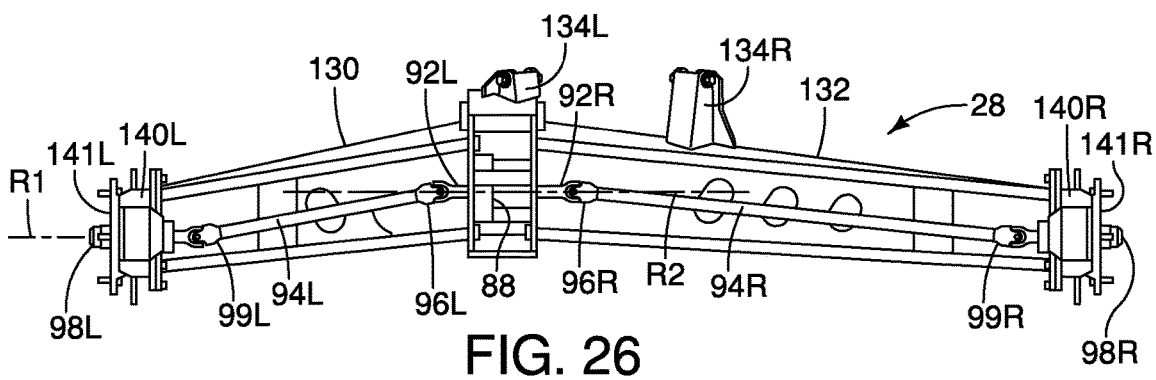
FIG. 26 is a rear side elevational view of the rear axle assembly of the rear suspension assembly illustrated in FIGS. 21 to 25 but with a portion of the rear axle broken away.

In the illustrated embodiment, the left drive shaft 94L has an inboard end connected to the left output axle 92L by a mechanical articulating joint 96L, while the right drive shaft 94R has an inboard end connected to the right output axle 92R by a mechanical articulating joint 96R. The left drive shaft 94L coupled to a left hub axle 98L of the left rear wheel 16L by a mechanical articulating joint 99L. The right drive shaft 94R is coupled to a right hub axle 98R of the right rear wheel 16R by a mechanical articulating joint 99R. The right and left output axles 92R and 92L have rotational axes R2 that are offset upward with respect to rotational axes R1 of the right and left hub axles 96 and 98. In this way, the solid rear axle 28 is a wishbone shaped rear axle. Alternatively, the rotational axes R2 of the right and left output axles 92R and 92L can be aligned with the rotational axes R1 of the right and left hub axles 96 and 98. In such a case, the solid rear axle 28 can have a straight configuration without the need for mechanical articulating joints instead of the wishbone configuration of the illustrated embodiment. Whether the solid rear axle 28 is a wishbone shaped rear axle or a straight configuration rear axle, the right drive shaft 94R and the left drive shaft 94L can be straight (aligned) as viewed from above as shown in FIG. 24. Alternatively, the solid rear axle 28 can be modified such that the right drive shaft 94R and the left drive shaft 94L can be swept forward as viewed from above, or such that the right drive shaft 94R and the left drive shaft 94L can be swept rearward as viewed from above.

Preferably, the mechanical articulating joints 96L, 96R, 99L and 99R are universal joints. However, other types of mechanical articulating joints can be used such as constant variable joints. In any case, the rear differential 88 transmits torque from the propeller shaft 90 to the right rear wheel 16R via the right drive shaft 94R and to the to the left rear wheel 16L via the left drive shaft 94L. In this way, in the illustrated embodiment, the motor 80 is operatively connected to the right and left rear wheels 16R and 16L via the rear differential 88.

Referring to FIGS. 12 to 14, 17 and 18, the propeller shaft 90 includes a first drive section 100 and a second drive section 102. The first drive section 100 has a first (front) end connected to the transmission 82 and a second end connected to the second drive section 102. The first drive section 100 of the propeller shaft 90 is connected to the transmission 82 to extend along the vertical center plane CP of the vehicle 10. The first drive section 100 of the propeller shaft 90 is preferably connected to the second drive section 102 of the propeller shaft 90 by a mechanical articulating joint 104 such as an articulating double cardan joint, a constant variable joint or a universal joint. In this way, the second drive section 102 of the propeller shaft 90 articulates relative to the first drive section 100. Preferably, the first drive section 100 of the propeller shaft 90 is supported on the rear portion 12B of the vehicle frame 12 by a bearing carrier 106. Alternatively, the bearing carrier 106 can be omitted with certain modifications. The second drive section 102 of the propeller shaft 90 is connected to the rear differential 88 by a mechanical articulating joint 108 such as an articulating double cardan joint, a constant variable joint or a universal joint.

Figure 12:
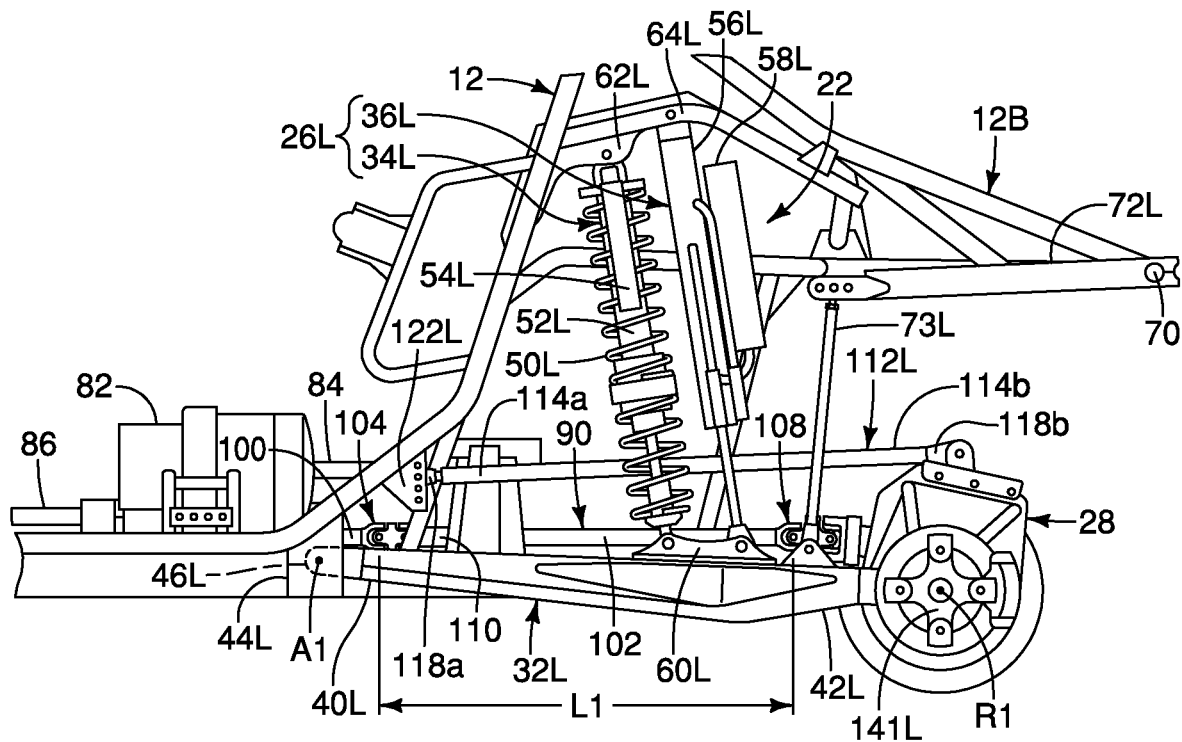
FIG. 12 is a left side elevational view, similar to FIG. 6, of selected parts of the rear portion of the recreational off-highway vehicle, but with the right rear wheel also removed, and showing the rear suspension assembly in the resting position (1 g of force)
Figure 13:
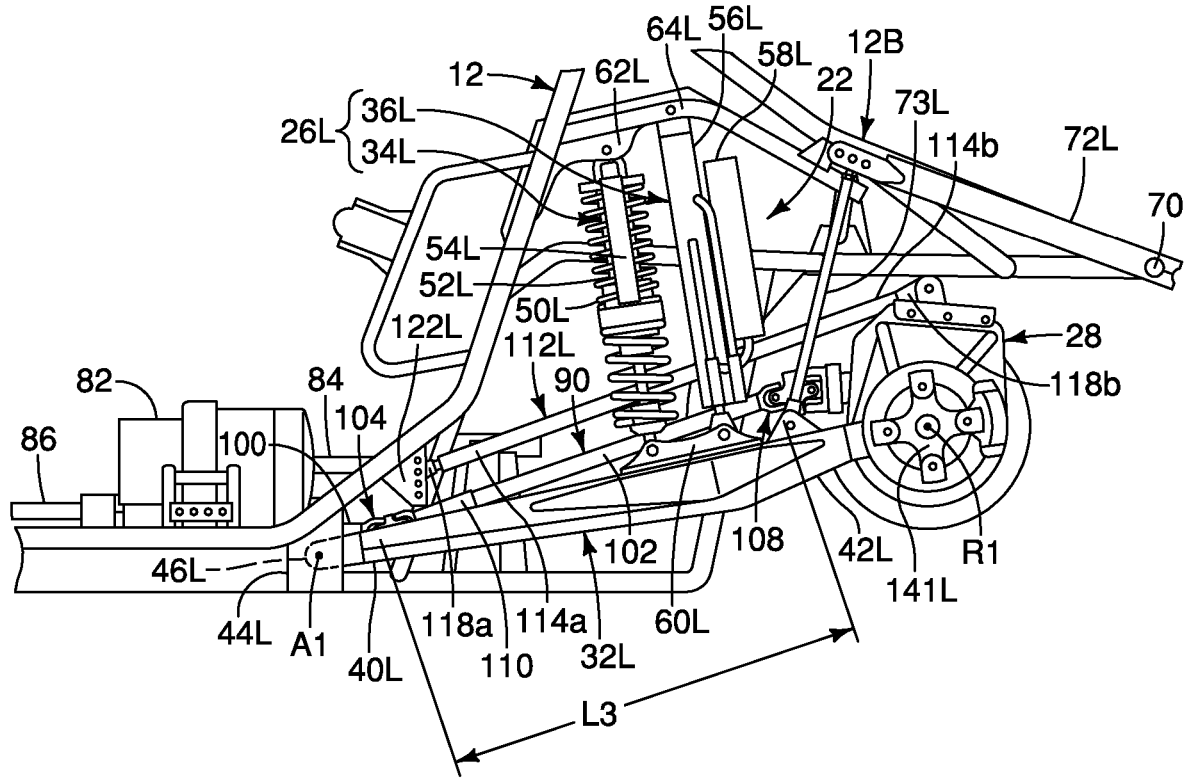
FIG. 13 is a left side elevational view, similar to FIG. 12, of selected parts of the rear portion of the recreational off-highway vehicle but with the rear suspension assembly in the full compression position.
Figure 14:
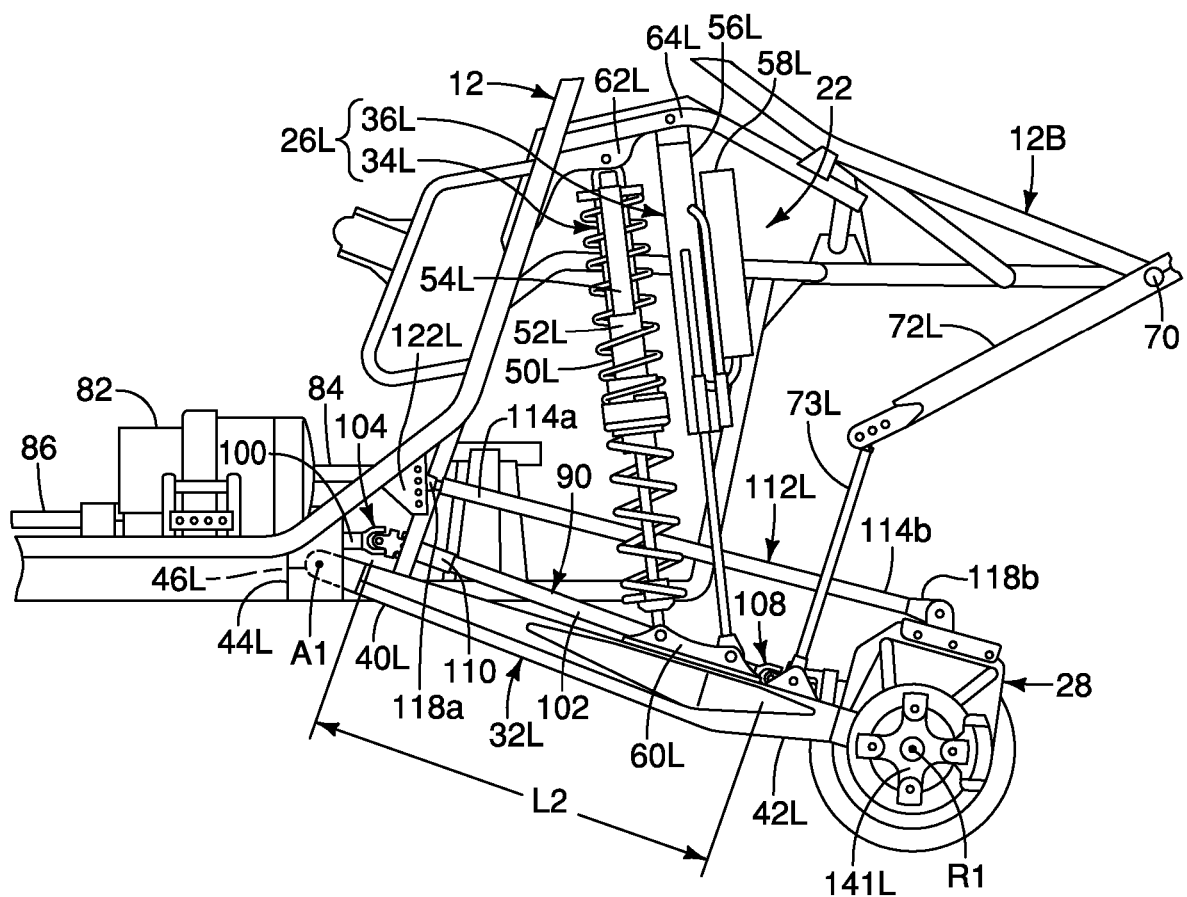
FIG. 14 is a left side elevational view, similar to FIGS. 12 and 13, of selected parts of the rear portion of the recreational off-highway vehicle but with the rear suspension assembly in the full extension position.
Figure 17:
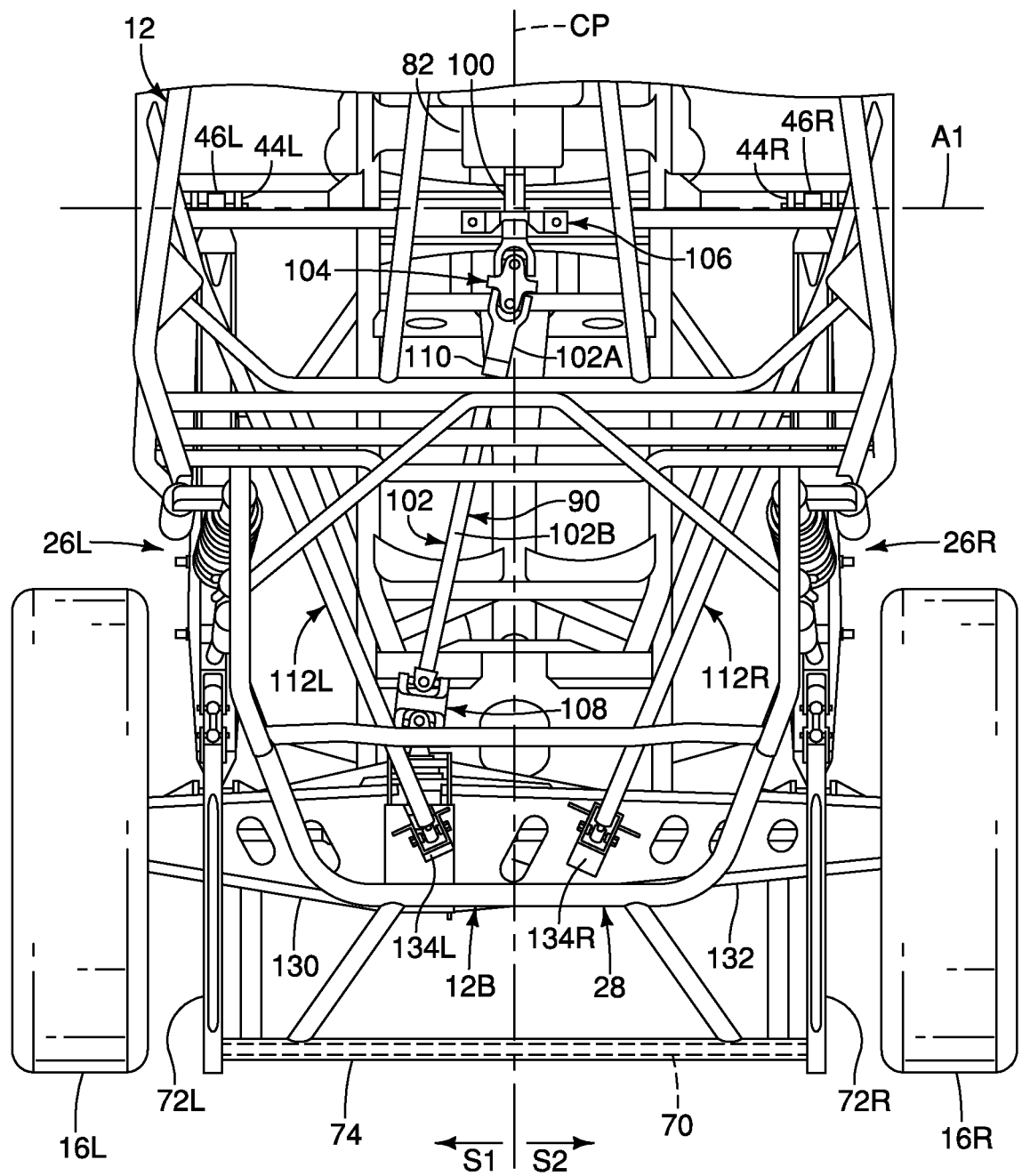
FIG. 17 is a top view of selected parts of the rear portion of the recreational off-highway vehicle showing the rear suspension assembly in the resting position (1 g of force)

Referring to FIGS. 17 and 18, here, the second drive section 102 of the propeller shaft 90 having a first part 102A and a second part 102B telescopically coupled together by a plunging connection 110. The plunging connection 110 is a splined connection that transmits torque from the first part 102A to the second part 102B, while allowing for the longitudinal length of the second drive section 102 of the propeller shaft 90 to change as the rear suspension 22 swings up and down in the vertical direction. As seen in FIG. 12, the second drive section 102 of the propeller shaft 90 has a first longitudinal length L1 while the at least one right shock absorber and the at least one second shock absorber are in resting states. As seen in FIGS. 13 and 14, the second drive section 102 of the propeller shaft 90 has a second longitudinal length L2 or L3, while the at least one right shock absorber and the at least one second shock absorber are in non-resting states. Here, the second longitudinal length L2 occurs when the right and left rear suspensions 26R and 26L are at the full extension positions. The third longitudinal length L3 occurs when the right and left rear suspensions 26R and 26L are at the full compression positions. The first longitudinal length L1 is different from the second and third longitudinal lengths L2 and L3. The second and third longitudinal lengths L2 and L3 can be either equal or different.

Preferably, the plunging connection 110 has a lipped oil seal and/or fork boot for spline protection. Alternatively, the propeller shaft 90 can be either a straight non-plunging propeller shaft that has a fixed length between the transmission 82 and the rear differential 88, or a straight plunging propeller shaft that has a variable length between the transmission 82 and the rear differential 88.

Figure 19:
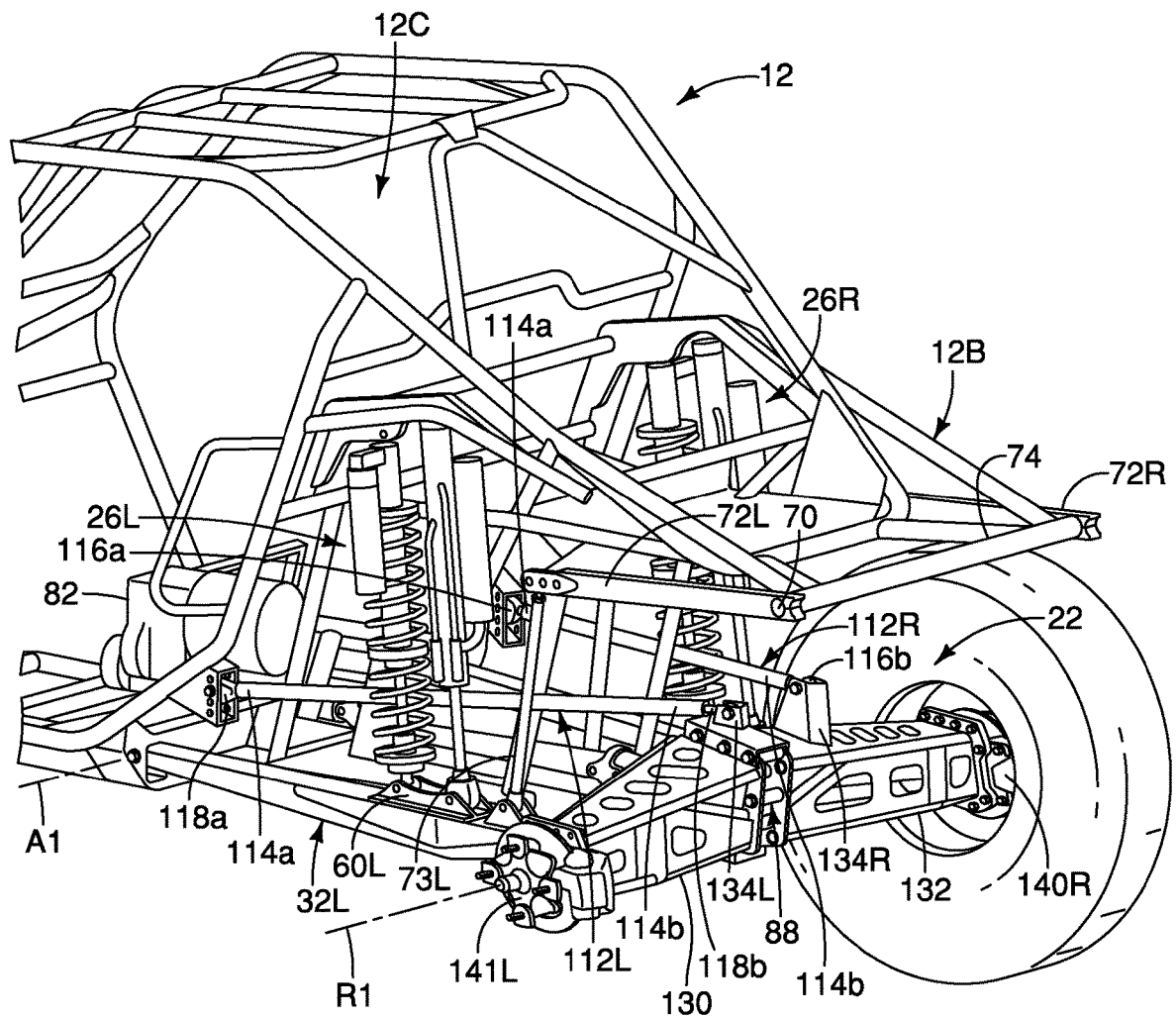
FIG. 19 is a rear perspective view of selected parts of the rear portion of the recreational off-highway vehicle with the left rear wheel removed to show the rear suspension assembly in the resting position (1 g of force)
Figure 20:
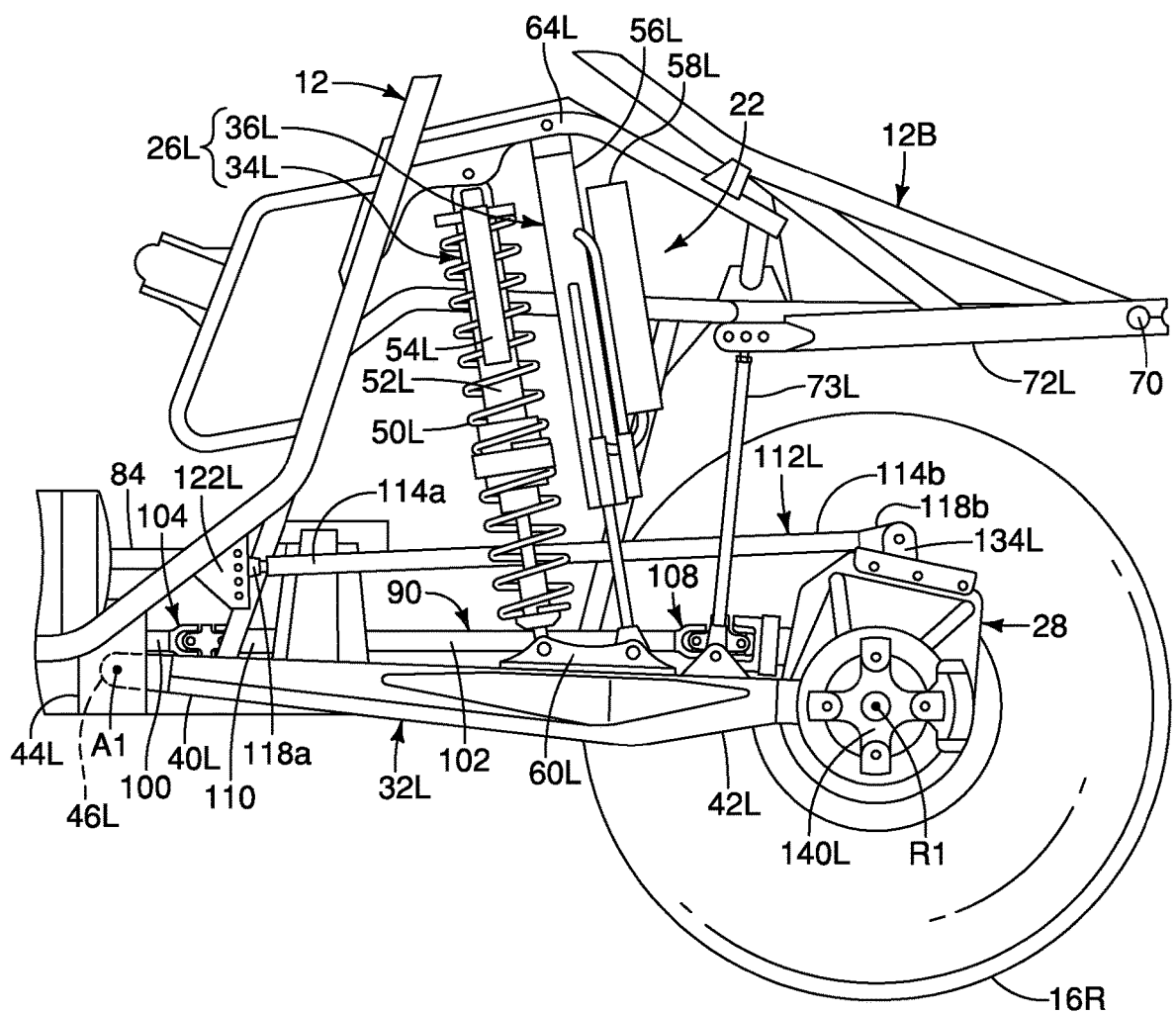
FIG. 20 is a left side elevational view, similar to FIG. 6, of selected parts of the rear portion of the recreational off-highway vehicle showing the rear suspension assembly in the resting position (1 g of force)
Figure 21:
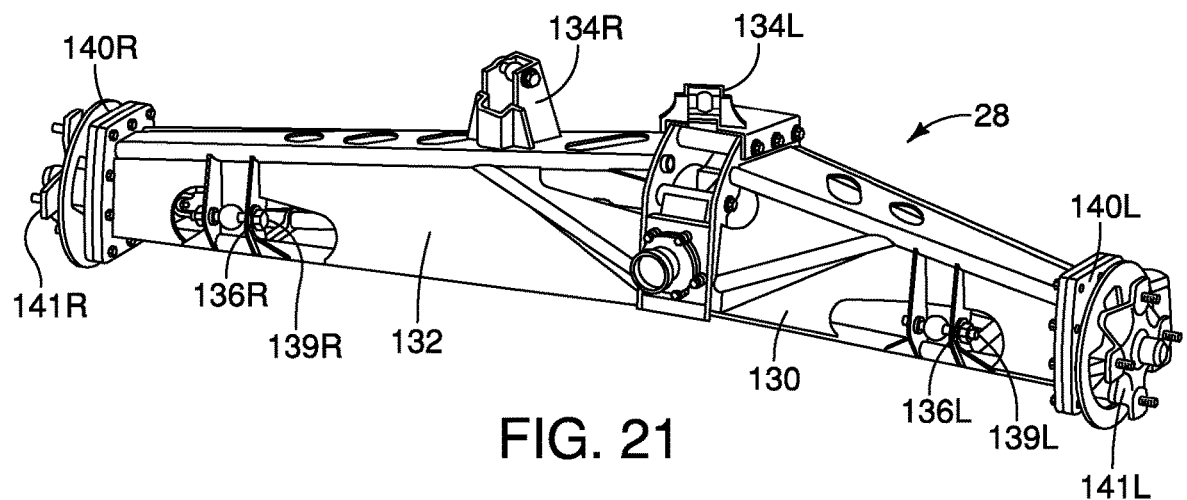
FIG. 21 is a front side perspective view of the rear axle assembly of the rear suspension assembly for the recreational off-highway vehicle.
Figure 22:
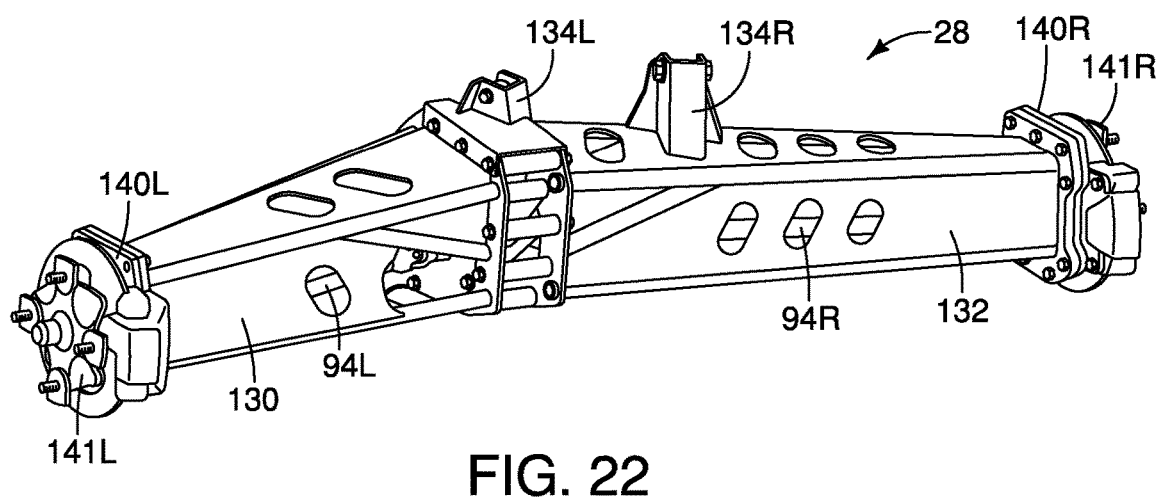
FIG. 22 is a rear side perspective view of the rear axle assembly of the rear suspension illustrated in FIG. 21.

Referring to FIG. 19, the vehicle 10 further comprises a left control link 112L and a right control link 112R. The left control link 112L has a first end 114a that is movably coupled to the vehicle frame 12 and a second end 114b that is movably coupled to the solid rear axle 28. The right control link 112R has a first end 116a that is movably coupled to the vehicle frame 12 and a second end 116b that is movably coupled to the solid rear axle 28. Here, the first end 114a of the left control link 112L includes a mechanical articulating joint 118a such as a spherical joint or a ball joint for pivotally coupling the first end 114a to the vehicle frame 12. Likewise, the second end 114b of the left control link 112L includes a mechanical articulating joint 118b such as a spherical joint or a ball joint for pivotally coupling the second end 114b to the solid rear axle 28. Also, the first end 116a of the right control link 112R includes a mechanical articulating joint 120a such as a spherical joint or a ball joint for pivotally coupling the first end 116a to the vehicle frame 12. Likewise, the second end 116b of the right control link 112R includes a mechanical articulating joint 120b such as a spherical joint or a ball joint for pivotally coupling the second end 116b to the solid rear axle 28.

Preferably, as seen in FIGS. 12 to 14, one of the first and second ends 114a and 114b of the left control link 112L is vertically adjustable with respect to a corresponding one of the vehicle frame 12 and the solid rear axle 28, and one of the first and second ends 116a and 116b of the right control link 112R is vertically adjustable with respect to a corresponding one of the vehicle frame 12 and the solid rear axle 28. Here, in the illustrated embodiment, the first ends 114a and 116a of the left and right control links 112L and 112R are vertically adjustable with respect to the vehicle frame 12. In particular, the vehicle frame 12 is provided with two mounts 122L and 122R that have a plurality of mounting holes for selectively coupling the first ends 114a and 116a of the left and right control links 112L and 112R at different vertical positions with respect to the vehicle frame 12. Here, the mounts 122L and 122R each have four mounting holes that establish four different positions. These mounting positions allow the squat of the vehicle 10 to be adjusted from 50% to 80%. The squat of the vehicle 10 refers to the extent that driveline tractive torque causes the rear of the vehicle 10 to compress under power. Alternatively, the squat of the vehicle 10 can be adjusted by having a plurality of mounting positions for coupling the left and right control links 112L and 112R to the solid rear axle 28. In addition, the squat of the vehicle 10 can be adjusted by having each of the left and right control links 112L and 112R be adjustable in length.

Referring to FIGS. 23 to 30, the solid rear axle 28 includes a first axle housing 130 and a second axle housing 132. The first axle housing 130 is designed to enclose and support the left drive shaft 94L has well as the mechanical articulating joints 96L and 99L. The second axle housing 132 is designed to enclose and support the right drive shaft 94R has well as the mechanical articulating joints 96R and 99R. Thus, the first and second axle housings 130 and 132 protect and support the left drive shaft 94L and the right drive shaft 94R, respectively.

In the illustrated embodiment, the rear differential 88 is a self-contained gear case in which the inboard ends of the first and second axle housings 130 and 132 are bolted to a housing of the rear differential 88. Alternatively, the rear differential 88 can be attached in other ways to the inboard ends of the first and second axle housings 130 and 132. Also, alternatively, the first and second axle housings 130 and 132 can be a solid one-piece axle housing that supports the rear differential 88 as needed and/or desired. The outboard end of the first axle housing 130 is preferably bolted to a left rear knuckle 140L, while the outboard end of the second axle housing 132 is preferably bolted to a right rear knuckle 140R. The left wheel 16L is attached to a left rear hub 141L that is rotatably supported on the left rear knuckle 140L in a conventional manner. The right wheel 16R is attached to a right rear hub 140R that is rotatably supported on the right rear knuckle 140R in a conventional manner.

As mentioned above, in the illustrated embodiment, the right and left output axles 92R and 92L have their rotational axes R2 offset upward with respect to rotational axes R1 of the right and left hub axles 96 and 98 to define a wishbone shaped rear axle. Alternatively, the first and second axle housings 130 and 132 can be configured such that the rotational axes R2 of the right and left output axles 92R and 92L are aligned with the rotational axes R1 of the right and left hub axles 96 and 98. In such a case, the solid rear axle 28 can have a straight configuration without the need for mechanical articulating joints instead of the wishbone configuration of the illustrated embodiment. Whether the solid rear axle 28 is a wishbone shaped rear axle or a straight configuration rear axle, the first and second axle housings 130 and 132 can be configured such that the right drive shaft 94R and the left drive shaft 94L can be straight (aligned) as viewed from above as shown in FIG. 24. Alternatively, whether the solid rear axle 28 is a wishbone shaped rear axle or a straight configuration rear axle, the first and second axle housings 130 and 132 can be configured such that the rotational axes R1 of the right and left rear wheels 16R and 16L are located forward of the rotational axes R2 of the right and left output axles 92R and 92L. In such a case, the right drive shaft 94R and the left drive shaft 94L are swept forward as viewed from above. In addition, alternatively, whether the solid rear axle 28 is a wishbone shaped rear axle or a straight configuration rear axle, the first and second axle housings 130 and 132 can be configured such that the rotational axes R1 of the right and left rear wheels 16R and 16L are located rearward of the rotational axes R2 of the right and left output axles 92R and 92L. In such a case, the right drive shaft 94R and the left drive shaft 94L are swept rearward as viewed from above.

Also, a left control link mount 134L is mounted between the first and second axle housings 130 and 132 for pivotally mounting the second end 114b of the left control link 112L. A right control link mount 134R is mounted on the second axle housing 132 for pivotally mounting the second end 116b of the right control link 112R. The left control link mount 134L and the right control link mount 134R are spaced equal distances from the vertical center plane CP of the vehicle 10.

Figure 27:
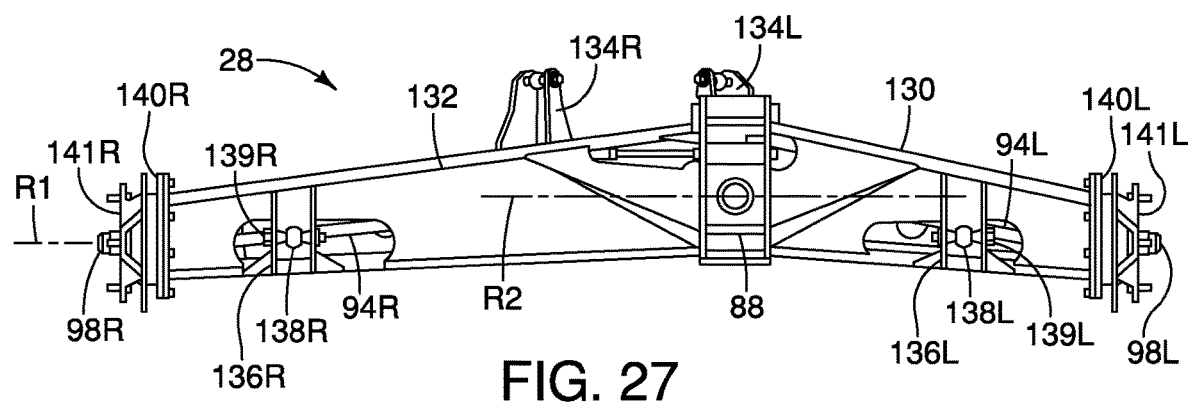
FIG. 27 is a front side elevational view of the rear axle assembly of the rear suspension assembly illustrated in FIGS. 21 to 26.
Figure 28:
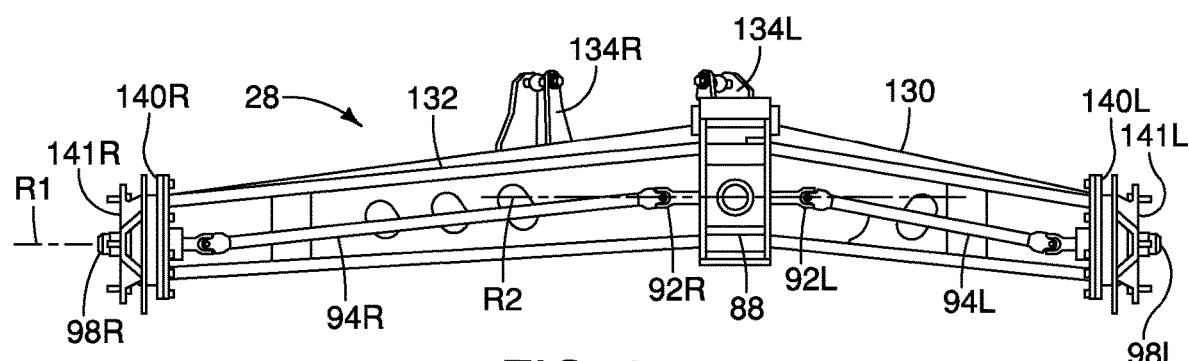
FIG. 28 is a front side elevational view of the rear axle assembly of the rear suspension assembly illustrated in FIGS. 21 to 27 but with a portion of the rear axle broken away.

More specifically, as seen in FIGS. 18 and 27, the solid rear axle 28 includes a pair of trailing arm mounts 136L and 136R that pivotally supports the rear ends 42L and 42R of the left and right trailing arms 32L and 32R. Here, the rear end 42L of the left trailing arm 32L includes a mechanical articulating joint 138L, while the rear end 42R of the right trailing arm 32R includes a mechanical articulating joint 138R. The mechanical articulating joints 138L and 138R are, for example, a Heim joint or spherical bearing that has a casing with a ball swivel movably supported therein and a threaded shaft attached thereto. The ball swivels of the mechanical articulating joints 138L and 138R each has an opening through which a bolt or other attaching hardware passes. Here, a bolt 139L passes through the opening in the ball swivel of the mechanical articulating joint 138L to pivotally connect the rear end 42L of the left trailing arm 32L to the trailing arm mount 136L of the solid rear axle 28. Likewise, a bolt 139R passes through the opening in the ball swivel of the mechanical articulating joint 138R to pivotally connect the rear end 42R of the right trailing arm 32R to the trailing arm mount 136R of the solid rear axle 28. The mechanical articulating joints 138L and 138R provide multiple degrees of freedom of movement. Since mechanical articulating joints are well known, the mechanical articulating joints 138L and 138R will not be discussed herein.

Figure 23:
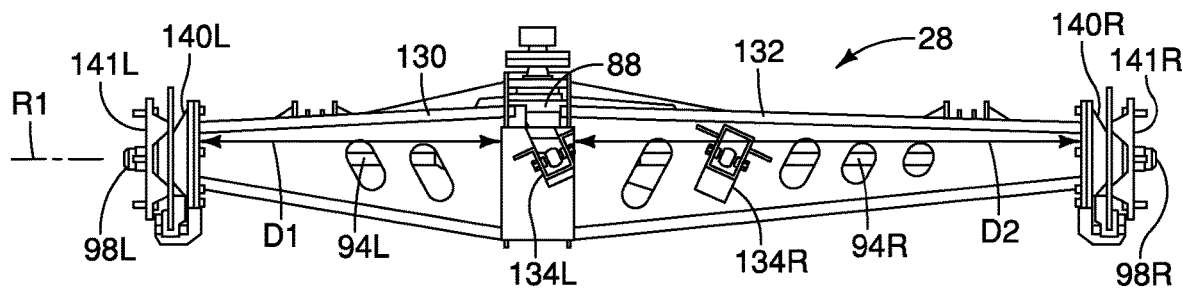
FIG. 23 is a top plan view of the rear axle assembly of the rear suspension assembly illustrated in FIGS. 21 and 22.

In the illustrated embodiment, as seen in FIG. 23, the first axle housing 130 has a first length D1 extending from the rear differential 88 to the left rear knuckle 140L of the left wheel 16L. The second axle housing 132 has a second length D2 extending from the rear differential 88 to the right rear knuckle 140R of the right wheel 16R. The first and second lengths D1 and D2 are unequal. Here, the second length D2 is longer than the first length D1. Alternatively, the rear suspension 22 can be configured such that the first axle housing 130 is longer than the second axle housing 132. Also, alternatively, the first and second axle housings 130 and 132 can have the same lengths as needed and/or desired.

The vehicle 10 further comprises many other conventional vehicle components, such as an accelerator pedal, a brake system, a radiator, a radiator fan, a fuel tank, an electrical system, an exhaust system, various lights, various displays, gauges, etc. that are typically provided on recreational off-highway vehicles. However, for the sake of brevity, only those vehicle components needed to understand the present invention will be illustrated and/or discussed herein.

Figure 29:
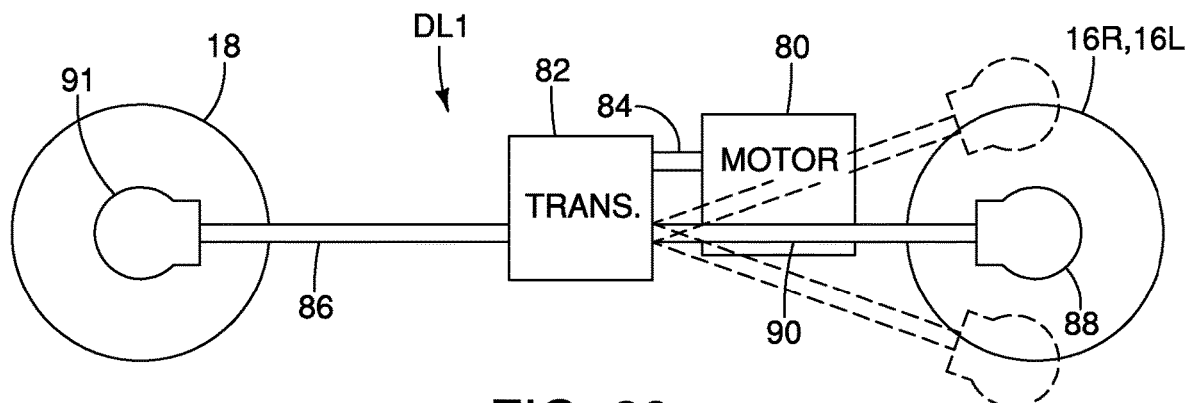
FIG. 29 is a diagrammatic illustration of the driveline of the recreational off-highway vehicle illustrated in FIGS. 1 and 2.

Referring now to FIG. 29, a diagrammatic illustration of the driveline DL1 shown in FIG. 3 is illustrated. Here, in the driveline DL1, the motor 80 is disposed rearward of the transmission 82 with the motor 80 being connected to the transmission 82 by the output shaft 84. The transmission 82 is connected to the front differential 91 by the propeller shaft 86. The front differential 91 is connected to the front wheels 18 by the transverse driveshafts (not shown). The transmission 82 is connected to the rear differential 88 by the propeller shaft 90. The rear differential 88 is connected to the rear wheels 16R and 16L by the output axles 92L and 92R (shown in FIG. 24). Here, the motor 80 (the internal combustion engine) has a crankshaft extending in a direction parallel to a longitudinal (front to back) direction of the vehicle 10.

Figure 30:
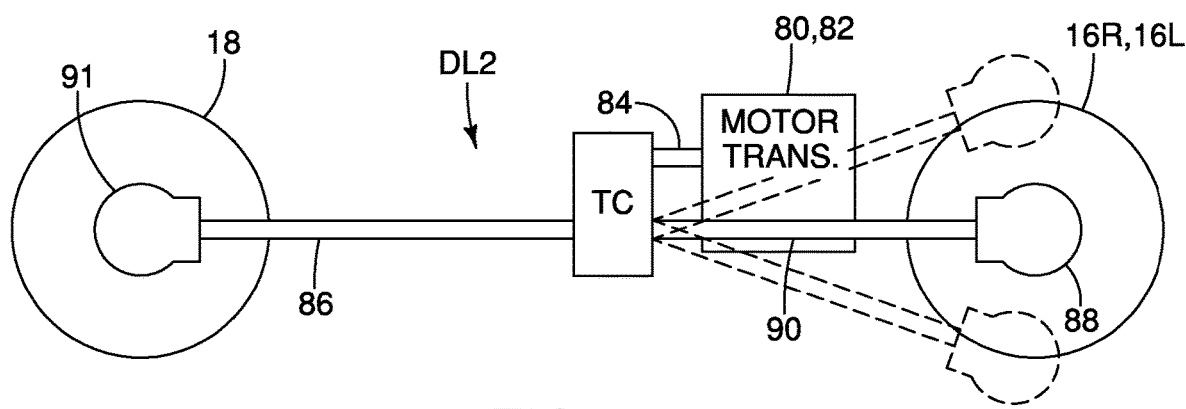
FIG. 30 is a diagrammatic illustration of a first modified driveline for the recreational off-highway vehicle illustrated in FIGS. 1 and 2.

Turning now to FIG. 30, a modified driveline DL2 is illustrated for the vehicle 10. The modified driveline DL2 is used in conjunction with the rear suspension 22 which is discussed above. Here, the modified driveline DL2 has an integrated engine-transmission unit 80-82 in which the output shaft 84 is connected to the transfer case TC. The transfer case TC is connected to the propeller shafts 86 and 90. Thus, the integrated engine-transmission unit 80-82 has a motor and a transmission that are connected together as a unit. The motor of the integrated engine-transmission unit 80-82 is an internal combustion engine but could be an electric motor. The front differential 91 is connected to the propeller shaft 86. The front differential 91 is connected to the front wheels 18 by the transverse driveshafts (not shown). The propeller shaft 90 transfers torque to the rear wheels 16R and 16L in the same manner as the driveline DL1. Here, the integrated engine-transmission unit 80-82 has a crankshaft of the engine extending in a direction parallel to a longitudinal (front to back) direction of the vehicle 10.

Figure 31:
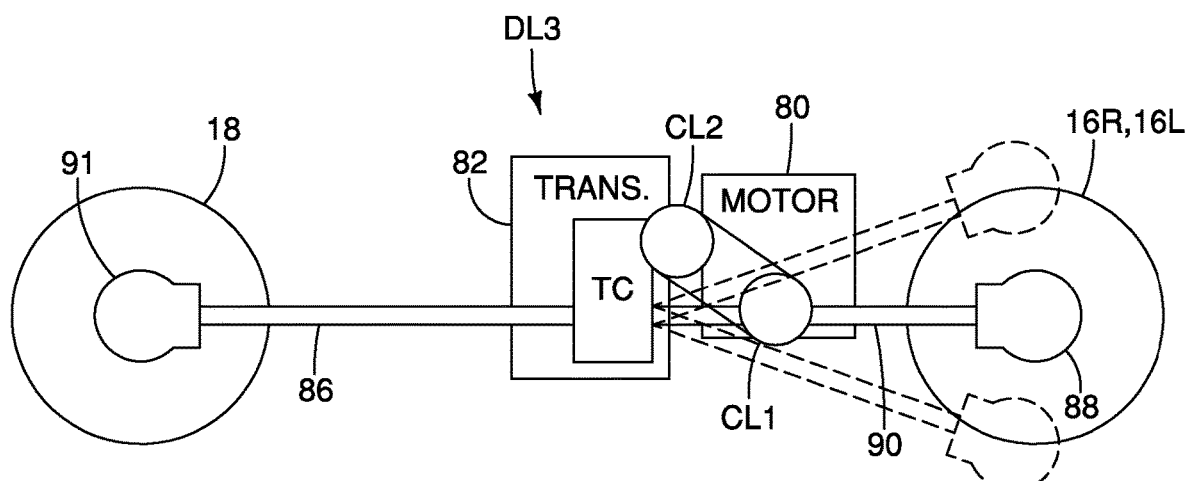
FIG. 31 is a diagrammatic illustration of a second modified driveline for the recreational off-highway vehicle illustrated in FIGS. 1 and 2.

Turning now to FIG. 31, a modified driveline DL3 is illustrated for the vehicle 10. The modified driveline DL3 is used in conjunction with the rear suspension 22 which is discussed above. Here, the modified driveline DL3 has the motor 80 connected to the transmission 82 by a belt drive using a pair of clutches CL1 and CL2. The transmission 82 is provided with a transfer case TC that is connect to the propeller shafts 86 and 90. The propeller shaft 86 is connected to the front differential 91. The front differential 91 is connected to the front wheels 18 by the transverse driveshafts (not shown). The propeller shaft 90 transfers torque to the rear wheels 16R and 16L in the same manner as the driveline DL1. Here, the motor 80 (the internal combustion engine) has a crankshaft of the engine extending in a direction transverse to the longitudinal (front to back) direction of the vehicle 10. Also, in the driveline DL3, the motor 80 is disposed rearward of the transmission 82.

Figure 32:
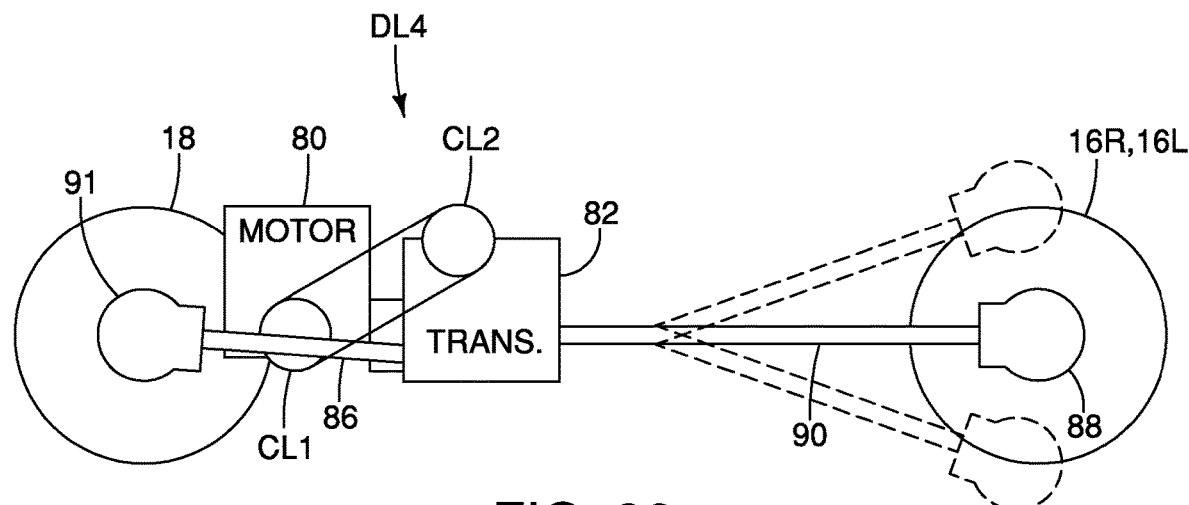
FIG. 32 is a diagrammatic illustration of a third modified driveline for the recreational off-highway vehicle illustrated in FIGS. 1 and 2.

Turning now to FIG. 32, a modified driveline DL4 is illustrated for the vehicle 10. The modified driveline DL4 is used in conjunction with the rear suspension 22 which is discussed above. Here, in the driveline DL4, the motor 80 is disposed forward of the transmission 82 with the motor 80 being connected to the transmission 82 by a belt drive using the clutches CL1 and CL2. The transmission 82 is provided with a transfer case TC that is connect to the propeller shafts 86 and 90. The propeller shaft 86 is connected to the front differential 91. The front differential 91 is connected to the front wheels 18 by the transverse driveshafts (not shown). The propeller shaft 90 transfers torque to the rear wheels 16R and 16L in the same manner as the driveline DL1. Here, the motor 80 (the internal combustion engine) has a crankshaft of the engine extending in a direction transverse to the longitudinal (front to back) direction of the vehicle 10.

Figure 33:
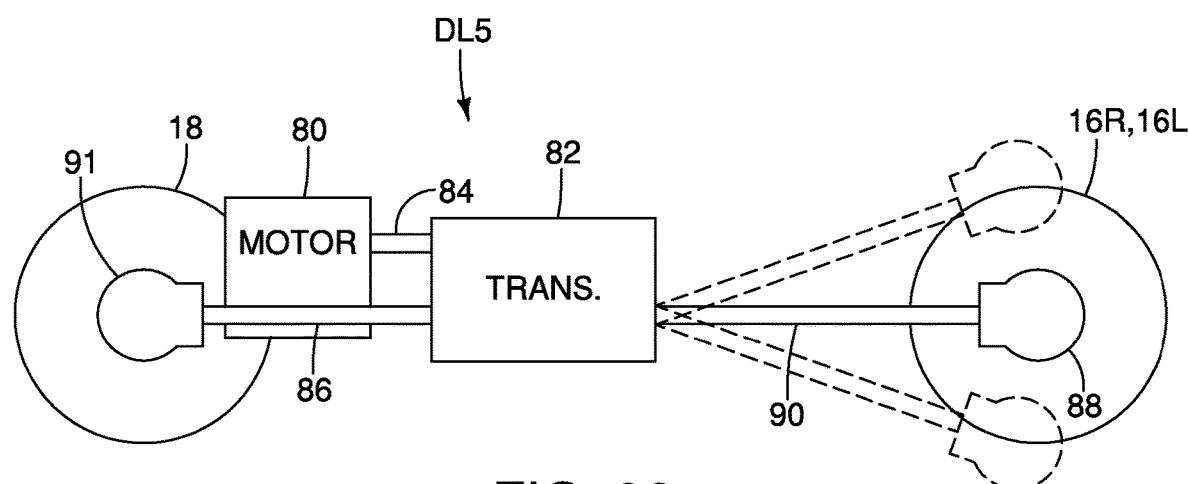
FIG. 33 is a diagrammatic illustration of a fourth modified driveline for the recreational off-highway vehicle illustrated in FIGS. 1 and 2.

Turning now to FIG. 33, a modified driveline DL5 is illustrated for the vehicle 10. Here, in the driveline DL5, the motor 80 is disposed forward of the transmission 82 and in front of the passenger compartment 14C. Here, a belt drive connects the motor 80 and the transmission 82 to transmit torque from the motor 80 to the transmission 82. The transmission 82 is connected to the front differential 91 by the propeller shaft 86. The front differential 91 is connected to the front wheels 18 by the transverse driveshafts (not shown). The transmission 82 is connected to the rear differential 88 by the propeller shaft 90. The rear differential 88 is connected to the rear wheels 16R and 16L by the output axles 92L and 92R (shown in FIG. 24). The propeller shaft 90 transfers torque to the rear wheels 16R and 16L in the same manner as the driveline DL1. Here, the motor 80 (the internal combustion engine) has a crankshaft extending in a direction parallel to a longitudinal (front to back) direction of the vehicle 10. In the illustrated embodiment, the transmission 82 is bolted to the motor 80 so that the motor 80 and the transmission 82 can be installed and/or removed as a unit with respect to the vehicle frame 12. Alternatively, the motor 80 and the transmission 82 can be separately mounted to the front portion 12A of the vehicle frame 12. In the illustrated embodiment, the transmission 82 is located rearward of the motor 80.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled"" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, positions and/or sections, these elements, components, regions, positions and/or sections should not be limited by these terms. These terms are only used to distinguish one element, component, region, layer, position or section from another element, component, region, layer, position or section. Thus, a first element, component, region, position or section discussed above could be termed a second element, component, region, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a recreational off-highway vehicle on a flat horizontal surface and with to a direction in which a driver looks straight when seated on a driver's seat in a straightforward driving direction. The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A recreational off-highway vehicle comprising:
   a vehicle frame having a front portion, a rear portion and a passenger compartment between the front and rear portions;
   at least one front wheel supporting the front portion of the vehicle frame;
   a right rear wheel supporting a right lateral side of the rear portion of the vehicle frame;
   a left rear wheel supporting a left lateral side of the rear portion of the vehicle frame;
   a solid rear axle rotatably supporting the right and left rear wheels at opposite ends of the solid rear axle;
   a right trailing arm having a front end pivotally connected to the vehicle frame and a rear end pivotally supporting a right end of the solid rear axle;
   a left trailing arm having a front end pivotally connected to the vehicle frame and a rear end pivotally supporting a left end of the solid rear axle;
   at least one right shock absorber coupled between the vehicle frame and the right trailing arm;
   at least one left shock absorber coupled between the vehicle frame and the left trailing arm;
   a rear differential supported on the solid rear axle and operatively connected to the left rear wheel and the right rear wheel;
   a transmission disposed on the vehicle frame and operatively connected to the rear differential by a propeller shaft to drive the right and left rear wheels via the rear differential; and
   a motor operatively connected to the transmission,
   the propeller shaft including a first drive section and a second drive section that articulates relative to the first drive section, the second drive section being connected to the first drive section and the rear differential via mechanical articulating joints, respectively, that are disposed at both ends of the second drive section.

2. The recreational off-highway vehicle according to claim 1, wherein
   the second drive section of the propeller shaft having a first part and a second part telescopically coupled together by a plunging connection, the second drive section has a first longitudinal length while the at least one right shock absorber and the at least one left shock absorber are in resting states, and a second longitudinal length while the at least one right shock absorber and the at least one left shock absorber are in non-resting states, the first longitudinal length and the second longitudinal length are different.

3. The recreational off-highway vehicle according to claim 1, wherein
   the rear differential has a right output axle coupled to a right hub axle of the right rear wheel, and a left output axle coupled to a left hub axle of the left rear wheel, the right and left output axles having rotational axes that are offset upward with respect to rotational axes of the right and left hub axles.

4. The recreational off-highway vehicle according to claim 1, further comprising
   a sway bar disposed inside an integral frame tube of the vehicle frame located rearward of rotational axes of the right and left rear wheels,
   a right arm fixed to a right end of the sway bar,
   a left arm fixed to a left end of the sway bar,
   a right link having a first end coupled to the right arm and a second end coupled to the right trailing arm, and
   a left link having a first end coupled to the left arm and a second end coupled to the left trailing arm.

5. The recreational off-highway vehicle according to claim 1, wherein
   the at least one right shock absorber includes a pair of right shock absorbers coupled between the vehicle frame and the right trailing arm; and
   the at least one left shock absorber includes a pair of left shock absorbers coupled between the vehicle frame and the left trailing arm.

6. The recreational off-highway vehicle according to claim 1, wherein
   the motor is located rearward of a seat in the passenger compartment.

7. The recreational off-highway vehicle according to claim 1, wherein
   the rear differential is disposed at a location laterally offset from a vertical center plane that is equally spaced from the left and right rear wheels.

8. The recreational off-highway vehicle according to claim 1, further comprising a left control link having a first end movably coupled to the vehicle frame and a second end movably coupled to the solid rear axle; and a right control link having a first end movably coupled to the vehicle frame and a second end movably coupled to the solid rear axle.

9. The recreational off-highway vehicle according to claim 8, wherein one of the first and second ends of each of the left and right control links is vertically adjustable with respect to a corresponding one of the vehicle frame and the solid rear axle.

10. The recreational off-highway vehicle according to claim 1, wherein the motor is disposed rearward of the transmission.

11. The recreational off-highway vehicle according to claim 1, wherein the solid rear axle rotatably supports the right and left rear wheels at the opposite ends of the solid rear axle such that the right and left rear wheels move together with respect to the vehicle frame.

12. A recreational off-highway vehicle comprising:

a vehicle frame having a front portion, a rear portion and a passenger compartment between the front and rear portions;

at least one front wheel supporting the front portion of the vehicle frame;

a right rear wheel supporting a right lateral side of the rear portion of the vehicle frame;

a left rear wheel supporting a left lateral side of the rear portion of the vehicle frame;

a solid rear axle rotatably supporting the right and left rear wheels at opposite ends of the solid rear axle;

a rear differential supported on the solid rear axle at a location that is laterally offset from a vertical center plane that is equally spaced from the left and right rear wheels, and operatively connected to the left rear wheel and the right rear wheel, the rear differential being entirely offset from a vertical center plane that is equally spaced from the left and right rear wheels such that the vertical center plane does not intersect the rear differential;

a motor operatively connected to the rear differential to drive the right and left rear wheels via the rear differential;

a right trailing arm having a front end pivotally connected to the vehicle frame and a rear end pivotally supporting a right end of the solid rear axle;

a left trailing arm having a front end pivotally connected to the vehicle frame and a rear end pivotally supporting a left end of the solid rear axle;

at least one right shock absorber coupled between the vehicle frame and the right trailing arm; and at least one left shock absorber coupled between the vehicle frame and the left trailing arm.

13. The recreational off-highway vehicle according to claim 12, further comprising a transmission disposed on the vehicle frame and operatively connected to the motor, the transmission being operatively connected to the rear differential by a propeller shaft to drive the right and left rear wheels via the rear differential.

14. The recreational off-highway vehicle according to claim 13, wherein the motor is disposed rearward of the transmission.

15. The recreational off-highway vehicle according to claim 13, wherein the motor is located rearward of a seat in the passenger compartment.

16. The recreational off-highway vehicle according to claim 12, wherein the rear differential has a right output axle coupled to a right hub axle of the right rear wheel, and a left output axle coupled to a left hub axle of the left rear wheel, the right and left output axles having rotational axes that are offset upward with respect to rotational axes of the right and left hub axles.

17. The recreational off-highway vehicle according to claim 12, further comprising a sway bar disposed inside an integral frame tube of the vehicle frame located rearward of rotational axes of the right and left rear wheels, a right arm fixed to a right end of the sway bar, a left arm fixed to a left end of the sway bar, a right link having a first end coupled to the right arm and a second end coupled to the right trailing arm, and a left link having a first end coupled to the left arm and a second end coupled to the left trailing arm.

18. The recreational off-highway vehicle according to claim 12, wherein the at least one right shock absorber includes a pair of right shock absorbers coupled between the vehicle frame and the right trailing arm; and the at least one left shock absorber includes a pair of left shock absorbers coupled between the vehicle frame and the left trailing arm.

19. The recreational off-highway vehicle according to claim 12, further comprising a left control link having a first end movably coupled to the vehicle frame and a second end movably coupled to the solid rear axle; and a right control link having a first end movably coupled to the vehicle frame and a second end movably coupled to the solid rear axle.

20. The recreational off-highway vehicle according to claim 19, wherein one of the first and second ends of each of the left and right control links is vertically adjustable with respect to a corresponding one of the vehicle frame and the solid rear axle.

21. The recreational off-highway vehicle according to claim 12, wherein the solid rear axle includes a first axle housing and a second axle housing, the first and second axle housings being bolted to a housing of the rear differential.

22. The recreational off-highway vehicle according to claim 21, wherein the first axle housing has a first length extending from the rear differential to a left knuckle of the left wheel, and the second axle housing has a second length extending from the rear differential to a knuckle hub of the right wheel, the first and second lengths are unequal.

23. The recreational off-highway vehicle according to claim 12, wherein the solid rear axle rotatably supports the right and left rear wheels at the opposite ends of the solid rear axle such that the right and left rear wheels move together with respect to the vehicle frame.

* * * * *